United States Patent
Oguz et al.

(10) Patent No.: US 8,331,448 B2
(45) Date of Patent: Dec. 11, 2012

(54) SYSTEMS AND METHODS FOR EFFICIENT SPATIAL INTRA PREDICTABILTY DETERMINATION (OR ASSESSMENT)

(75) Inventors: Seyfullah Halit Oguz, San Diego, CA (US); Sitaraman Ganapathy Subramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1148 days.

(21) Appl. No.: 11/963,323

(22) Filed: Dec. 21, 2007

(65) Prior Publication Data

US 2008/0152005 A1 Jun. 26, 2008

Related U.S. Application Data

(60) Provisional application No. 60/871,648, filed on Dec. 22, 2006.

(51) Int. Cl.
*H04N 7/12* (2006.01)
(52) U.S. Cl. .................................... 375/240.13
(58) Field of Classification Search .............. 370/240.12, 370/240.13, 240.18; 375/240–240.29
See application file for complete search history.

(56) References Cited

U.S. PATENT DOCUMENTS

| | | | |
|---|---|---|---|
| 5,815,602 A | 9/1998 | Ueda et al. | |
| 7,450,640 B2 * | 11/2008 | Kim et al. | 375/240.12 |
| 2005/0281337 A1* | 12/2005 | Kobayashi et al. | 375/240.18 |
| 2006/0176962 A1* | 8/2006 | Arimura et al. | 375/240.24 |
| 2006/0203916 A1* | 9/2006 | Chandramouly et al. | 375/240.24 |
| 2007/0206872 A1* | 9/2007 | Song | 382/236 |

FOREIGN PATENT DOCUMENTS

| | | |
|---|---|---|
| CN | 1774930 A | 5/2006 |
| EP | 1607909 A1 | 12/2005 |
| JP | 2005151017 A | 6/2005 |
| JP | 2005176073 A | 6/2005 |
| JP | 2006005659 A | 1/2006 |
| KR | 2005046929 | 5/2005 |
| WO | WO2004080084 A1 | 9/2004 |
| WO | WO2004093461 A1 | 10/2004 |

OTHER PUBLICATIONS

"Fast Intra-Prediction Mode Section for 4×4 Blocks in H.264", Bojun Meng and Oscar Au, Proc. of IEEE Int. Conf. on Acoustics, Speech and Signal, vol. 3, 6-10, pp. III-389-392, Apr. 2003.*
Changsung Kim et al: "Feature-based intra-prediction mode decision for H.264" Image Processing, 2004, ICIP 04. 2004 International Conference on Singapore Oct. 24-27, 2004. Piscataway, NJ, USA. IEEE, vol. 2, Oct. 24, 2004, pp. 769-772, XP010785116 ISBN: 978-0-7803-8554-2.

(Continued)

*Primary Examiner* — Mark Rinehart
*Assistant Examiner* — Peter Cheng
(74) *Attorney, Agent, or Firm* — Elaine Lo

(57) ABSTRACT

Techniques for efficient determination of a macroblock's spatial predictability quality with respect to the H.264 specification are provided. A device comprises a processor operable to estimate a first subset of spatial prediction modes based on a first pixel subset of a current subblock of an intra-frame. The processor is also operable to estimate a second subset of spatial prediction modes based on a second pixel subset of the current subblock. The first subset of prediction modes is different from the second subset of prediction modes.

34 Claims, 14 Drawing Sheets

OTHER PUBLICATIONS

International Search Report and Written Opinion—PCT/US2007/088761, International Search Authority—European Patent Office—Aug. 4, 2009.

Bojun Meng et al., Efficient intra-prediction algorithm in H.264, Proceedings of International Conference on Image Processing (ICIP 2003), IEEE, Sep. 2003, vol. 3,pp. III-837-III-840.

Bojun Meng et al., Efficient intra-prediction mode selection for 4×4 blocks in H.264 ,Proceedings of International Conference on Multimedia and Expo(ICME '03), IEEE, Jul. 2003, vol. 3, pp. III-521-III-524.

Zhang J et al: "A fast intra prediction method for H.264 video coding" Proceedings of the SPIE, SPIE, Bellingham, VA, US, vol. 5203, Jan. 1, 2003, pp. 753-761, XP002285980 ISSN: 0277-786X.

Dai, et al., "Fast interprediction mode decision for H.264", 2004 IEEE International Conference on Multimedia and Expo (ICME),Taipei, Taiwan,Jun. 27-30, 2004 , pp. 1123-1126, XP010771021.

Huang , et al., "Analysis, Fast Algorithm, and VLSI Architecture Design for H.264IAVC Intra Frame Coder", IEEE Transactions on Circuits and Systems for Video Technology, Mar. 1, 2005 , pp. 378-401 ,vol. 15 No. 3, XP011127214.

Lee ,et al., "An Implementation of H.264 Intra Predictor Based on Subsampling", IEEE Asia Pacific Conference on Circuits and Systems, 2006 , Dec. 4-7, 2006. APCCAS 2006, pp. 1079-1082, XP031071026.

Akiyuki Yazawa et al., "High-Speed Determination of Optimization Mode for Rate-Distortion in H.264," Journal of the Institute of Electronics, Information and Communication Engineers D, Jan. 2006, vol. J89-D, No. 1, pp. 27-39.

* cited by examiner

SYSTEMS AND METHODS FOR EFFICIENT SPATIAL INTRA PREDICTABILTY DETERMINATION (OR ASSESSMENT)

This application claims the benefit of U.S. Provisional Application No. 60/871,648, filed on Dec. 22, 2006, the entire content of which is incorporated herein by reference.

BACKGROUND

1. Field

The present disclosure relates generally to video encoding and decoding and, more specifically, to techniques for efficient determination of a macroblock's spatial predictability quality with respect to the H.264 specification.

2. Background

An independently decodable intra-coded frame is the most common form of frame that enables random access to the video signal. The MPEG-x and H.26x standards use what is known as a group of pictures (GOP) which comprises an intra-coded frame (also called an I-frame) and temporally predicted P-frames or bi-directionally predicted B frames that reference the J-frame and/or other P and/or B frames within the GOP. Longer GOPs are desirable for the increased compression ratios, but shorter GOPs allow for quicker acquisition and random access. Increasing the number of J-frames will permit quicker acquisition and random access, but at the expense of lower compression.

Previously, to determine a macroblock's spatial intra predictability an exhaustive search or edge detection based algorithms have been used. However, these algorithms are computationally complex and in particular the edge detection based algorithms produce an estimation with a relatively high probability of error.

Known spatial prediction methods in general do not provide a staged approach for minimizing the computational complexities while also providing a relatively low probability of error in the estimation process. Assessing in a computationally efficient manner and with high accuracy the intra predictability of a macroblock is an important component of mode decision algorithms executed by encoders/transcoders.

Thus, there is a need for techniques for efficient determination of a macroblock's spatial predictability quality with respect to the H.264 specification.

SUMMARY

Techniques for efficient determination of a macroblock's spatial predictability quality with respect to the H.264 specification are provided. A device comprising a processor operable to estimate a first subset of spatial prediction modes based on a first pixel subset of a current subblock of an intra-frame is provided. The processor is also operable to estimate a second subset of spatial prediction modes based on a second pixel subset of the current subblock. The first subset of prediction modes is different from the second subset of prediction modes and in one aspect the first pixel subset is mutually exclusive of the second pixel subset. The device also includes a memory coupled to the processor. In another aspect, the first pixel subset is partially overlapping the second pixel subset.

In yet another aspect, a multimedia system comprising an encoder operable to estimate a first subset of spatial prediction modes based on a first pixel subset of a current subblock of an intra-frame is provided. The encoder is operable to estimate a second subset of spatial prediction modes based on a second pixel subset of the current subblock. The first subset of prediction modes is different from the second subset of prediction modes. The system further includes a decoder operable to decode the intra-frame based on the first subset of spatial prediction modes and the second subset of spatial prediction modes.

Additional aspects will become more readily apparent from the detailed description, particularly when taken together with the appended drawings.

Figure 1:
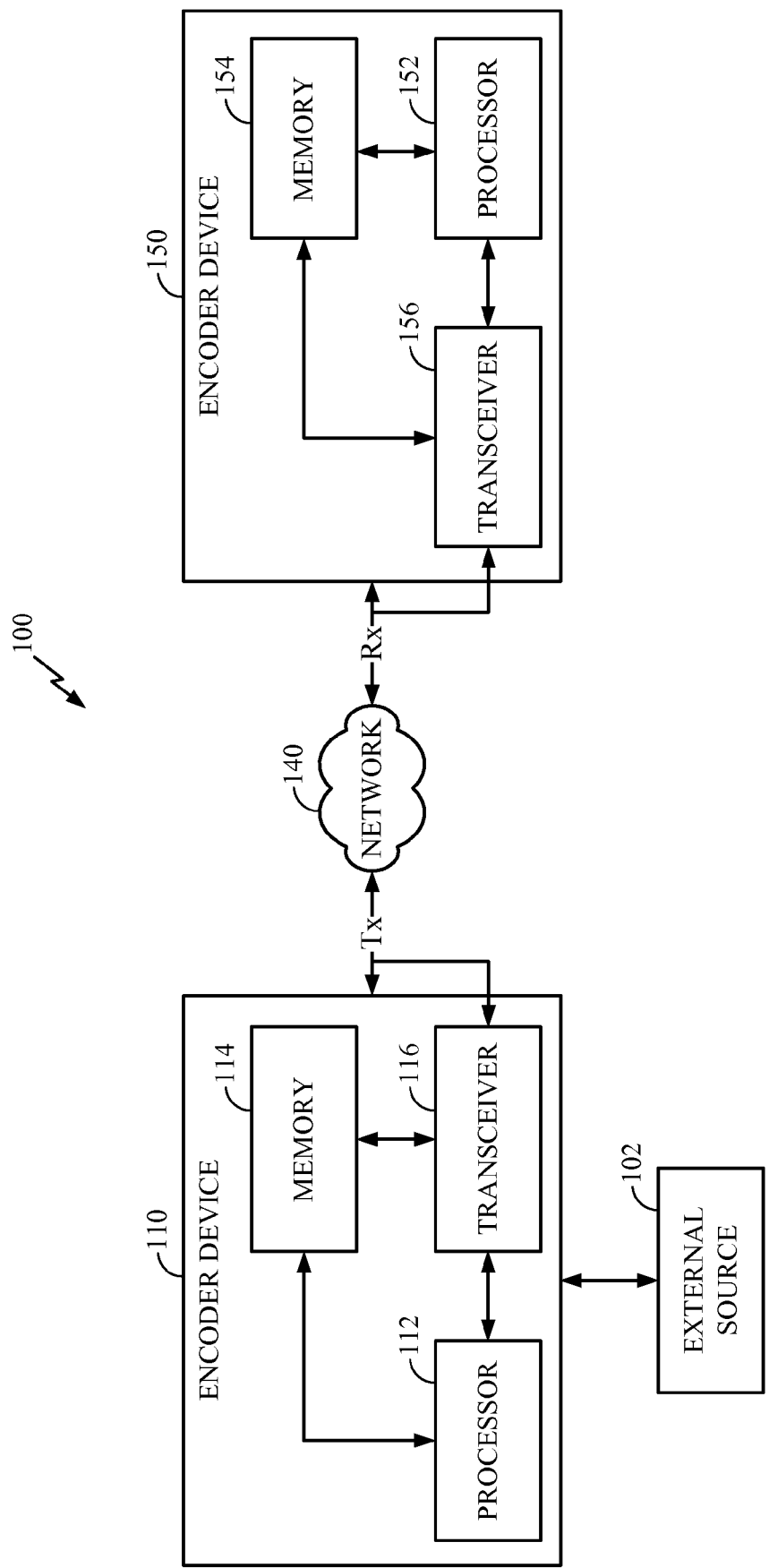
FIG. 1 illustrates a block diagram of an exemplary multimedia communications system according to certain embodiments.

The images in the drawings are simplified for illustrative purposes and are not depicted to scale. To facilitate understanding, identical reference numerals have been used, where possible, to designate identical elements that are common to the figures, except that suffixes may be added, when appropriate, to differentiate such elements.

The appended drawings illustrate exemplary configurations of the invention and, as such, should not be considered as limiting the scope of the invention that may admit to other equally effective configurations. It is contemplated that features or blocks of one configuration may be beneficially incorporated in other configurations without further recitation.

DETAILED DESCRIPTION

The word "exemplary" is used herein to mean "serving as an example, instance, or illustration." Any configuration or design described herein as "exemplary" is not necessarily to be construed as preferred or advantageous over other configurations or designs, and the terms "core", "engine", "machine", "processor" and "processing unit" are used interchangeably.

The following detailed description is directed to certain sample embodiments. However, the disclosure can be embodied in a multitude of different ways as defined and covered by the claims. In this description, reference is made to the drawings wherein like parts are designated with like numerals throughout.

Video signals may be characterized in terms of a series of pictures, frames, and/or fields, any of which may further include one or more slices. As used herein, the term "frame" is a broad term that may encompass one or more of frames, fields, pictures and/or slices.

Embodiments include systems and methods that facilitate channel switching in a multimedia transmission system. Multimedia data may include one or more of motion video, audio, still images, text or any other suitable type of audio-visual data.

Multimedia processing systems, such as video encoders, may encode multimedia data using encoding methods based on international standards such as Moving Picture Experts Group (MPEG)-1, -2 and -4 standards, the International Telecommunication Union (ITU)-T H.263 standard, and the ITU-T H.264 standard and its counterpart, ISO/IEC MPEG-4, Part 10, i.e., Advanced Video Coding (AVC), each of which is fully incorporated herein by reference for all purposes. Such encoding, and by extension, decoding, methods generally are directed to compressing the multimedia data for transmission and/or storage. Compression can be broadly thought of as the process of removing redundancy from the multimedia data.

A video signal may be described in terms of a sequence of pictures, which include frames (an entire picture), or fields (e.g., an interlaced video stream comprises fields of alternating odd or even lines of a picture). Further, each frame or field may further include one or more slices, or sub-portions of the frame or field. As used herein, either alone or in combination with other words, the term "frame" may refer to a picture, a frame, a field or a slice thereof. Video encoding methods compress video signals by using lossless or lossy compression algorithms to compress each frame. Intra-frame coding (also referred to herein as intra-coding) refers to encoding a frame using only that frame. Inter-frame coding (also referred to herein as inter-coding) refers to encoding a frame based on other, "reference," frames. For example, video signals often exhibit temporal redundancy in which frames near each other in the temporal sequence of frames have at least portions that exactly match or at least partially match each other.

Multimedia processors, such as video encoders, may encode a frame by partitioning it into subsets of pixels. These subsets of pixels may be referred to as blocks or macroblocks and may include, for example, 16×16 pixels. The encoder may further partition each 16×16 macroblock into subblocks. Each subblock may further comprise additional subblocks. For example, subblocks of a 16×16 macroblock may include 16×8 and 8×16 subblocks. Each of the 16×8 and 8×16 subblocks may include, for example, 8×8 subblocks, which themselves may include, for example, 4×4, 4×8 and 8×4 subblocks, and so forth. As used herein, the term "block" may refer to either a macroblock or any size of subblock.

Encoders take advantage of temporal redundancy between sequential frames using motion compensation based inter-coding algorithms. Motion compensation algorithms identify portions of one or more reference frames that at least partially match a block. The block may be shifted in the frame relative to the matching portion of the reference frame(s). This shift is characterized by one or more motion vector(s). Any differences between the block and partially matching portion of the reference frame(s) may be characterized in terms of one or more residual(s). The encoder may encode a frame as data that comprises one or more of the motion vectors and residuals for a particular partitioning of the frame. A particular partition of blocks for encoding a frame may be selected by approximately minimizing a cost function that, for example, balances encoding size with distortion, or perceived distortion, to the content of the frame resulting from an encoding.

Inter-coding enables more compression efficiency than intra-coding. However, inter-coding can create problems when reference data (e.g., reference frames or reference fields) are lost due to channel errors, and the like. In addition to loss of reference data due to errors, reference data may also be unavailable due to initial acquisition or reacquisition of the video signal at an inter-coded frame. In these cases, decoding of inter-coded data may not be possible or may result in undesired errors and error propagation. These scenarios can result in an unacceptable quality loss in the video stream.

FIG. 1 illustrates a block diagram of an exemplary multimedia communications system 100 according to certain embodiments. The system 100 includes an encoder device 110 in communication with a decoder device 150 via a network 140. In one example, the encoder device 110 receives a multimedia signal from an external source 102 and encodes that signal for transmission on the network 140.

In this example, the encoder device 110 comprises a processor 112 coupled to a memory 114 and a transceiver 116. The processor 112 encodes data from the multimedia data source and provides it to the transceiver 116 for communication over the network 140.

In this example, the decoder device 150 comprises a processor 152 coupled to a memory 154 and a transceiver 156. The processor 152 may include one or more of a general purpose processor and/or a digital signal processor. The memory 154 may include one or more of solid state or disk based storage. The transceiver 156 is configured to receive multimedia data over the network 140 and provide it to the processor 152 for decoding. In one example, the transceiver 156 includes a wireless transceiver. The network 140 may comprise one or more of a wired or wireless communication system, including one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, an orthogonal frequency division multiple (OFDM) access system, a time division multiple access (TDMA) system such as GSM/GPRS (General packet Radio Service)/ EDGE (enhanced data GSM environment), a TETRA (Terrestrial Trunked Radio) mobile telephone system, a wideband code division multiple access (WCDMA) system, a high data rate (1xEV-DO or 1xEV-DO Gold Multicast) system, an IEEE 802.11 system, a MediaFLO system, a digital multimedia broadcasting (DMB) system, a digital video broadcasting-handheld (DVB-H) system, and the like.

Figure 2A:
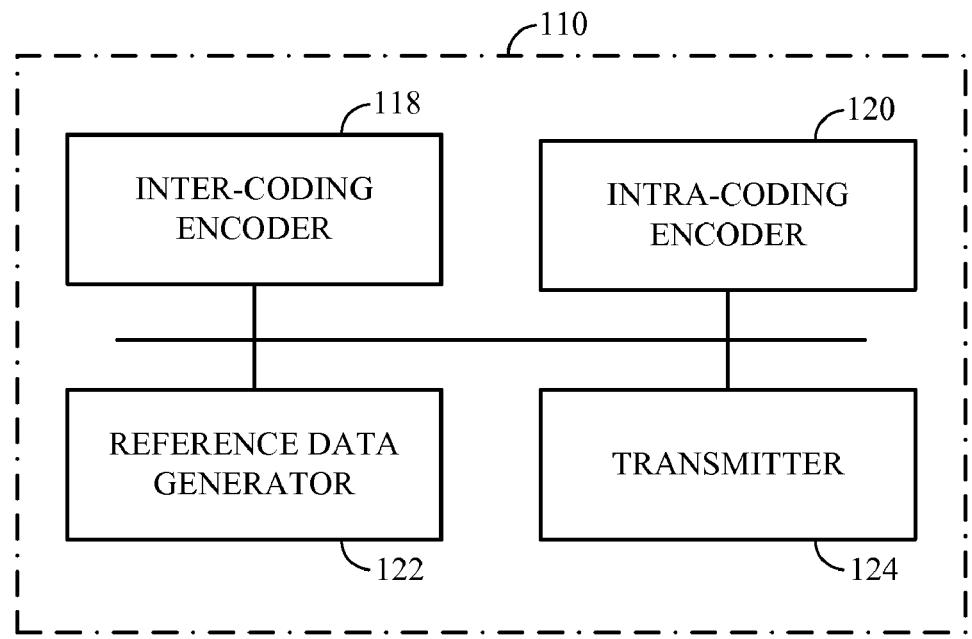
FIG. 2A illustrates a block diagram of an exemplary encoder device that may be used in system of FIG. 1.

FIG. 2A illustrates a block diagram of an exemplary encoder device 110 that may be used in system 100 of FIG. 1 according to certain embodiments. In this embodiment, the encoder device 110 comprises an inter-coding encoder 118, an intra-coding encoder 120, a reference data generator 122 and a transmitter 124. The inter-coding encoder 118 encodes inter-coded portions of video that are predicted temporally (e.g., using motion compensated prediction) in reference to other portions of video data located in other temporal frames. The intra-coding encoder 120 encodes intra-coded portions of video that can be decoded independently without reference to other temporally located video data. In some embodiments, the intra-coding encoder 120 may use spatial prediction to take advantage of redundancy in the video data located in the same temporal frame.

The reference data generator 122, in one aspect, generates data that indicates where the intra-coded and inter-coded video data generated by the encoders 120 and 118 respectively are located. For example, the reference data may include identifiers of subblocks and/or macroblocks that are used by a decoder to locate a position within a frame. The reference data may also include a frame sequence number used to locate a frame within a video frame sequence.

The transmitter 124 transmits the inter-coded data, the intra-coded data, and, in some embodiments, the reference data, over a network such as the network 140 of FIG. 1. The data may be transmitted over one or more communication links. The terms communication links are used in a general sense and can include any channels of communication including, but not limited to, wired or wireless networks, virtual channels, optical links, and the like. In some embodiments the intra-coded data is transmitted on a base layer communication link and the inter-coded data is transmitted over an enhancement layer communication link. In some embodiments, the intra-coded data and the inter-coded data are transmitted over the same communication link. In some embodiments, one or more of the inter-coded data, the intra-coded data and the reference data may be transmitted over a sideband communication link. For example, a sideband communication link such as the Supplemental Enhancement Information (SEI) messages of H.264 or user_data messages of MPEG-2 may be used. In some embodiments, one or more of the intra-coded data, the inter-coded data and the reference data are transmitted over a virtual channel. A virtual channel may comprise data packets containing an identifiable packet header that identifies the data packet as belonging to the virtual channel. Other forms of identifying a virtual channel are known in the art such as frequency division, time division, code spreading, etc.

Figure 2B:
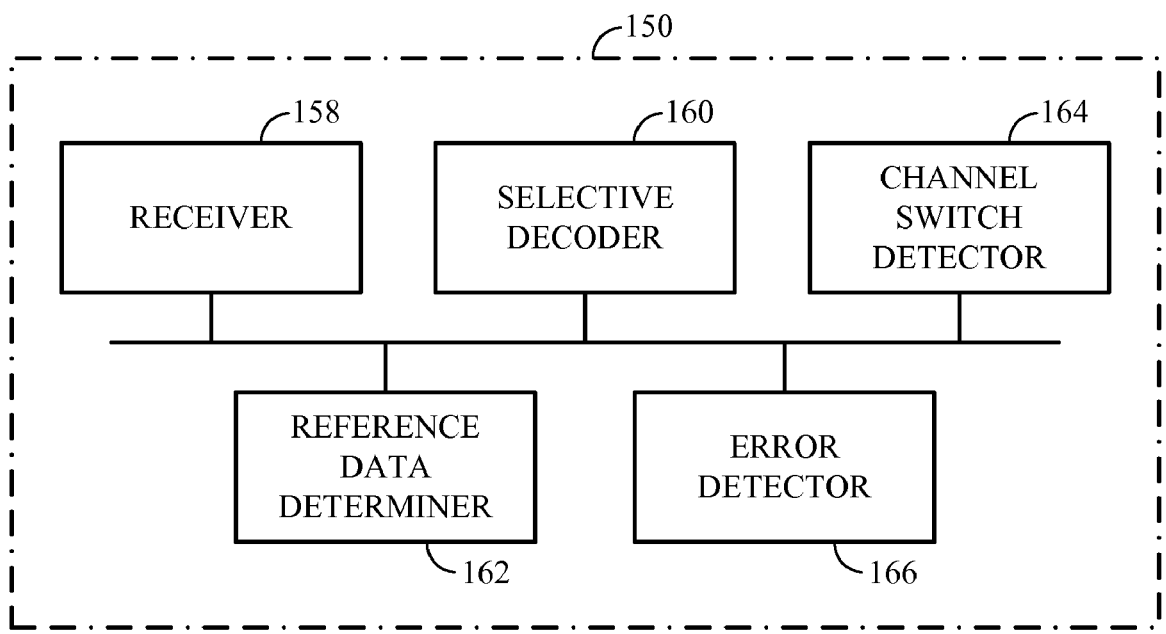
FIG. 2B illustrates a block diagram of an exemplary decoder device that may be used system of FIG. 1.

FIG. 2B illustrates a block diagram of an exemplary decoder device 150 that may be used system 100 of FIG. 1 according to certain embodiments. In this embodiment, the decoder device 150 comprises a receiver 158, a selective decoder 160, a reference data determiner 162, and one or more reference data availability detectors such as a channel switch detector 164 and an error detector 166.

The receiver 158 receives encoded video data (e.g., data encoded by the encoder device 110 of FIGS. 1 and 2A). The receiver 158 may receive the encoded data over a wired or wireless network such as the network 140 of FIG. 1. The data may be received over one or more communication links. In some embodiments, the intra-coded data is received on a base layer communication link and the inter-coded data is received over an enhancement layer communication link. In some embodiments, the intra-coded data and the inter-coded data are received over the same communication link. In some embodiments, one or more of the inter-coded data, the intra-coded data and the reference data may be received over a sideband communication link. For example, a sideband communication link such as the Supplemental Enhancement Information (SEI) messages of H.264 or user_data messages of MPEG-2 may be used. In some embodiments, one or more of the intra-coded data, the inter-coded data and the reference data are received over a virtual channel. A virtual channel may comprise data packets containing an identifiable packet header that identifies the data packet as belonging to the virtual channel. Other forms of identifying a virtual channel are known in the art.

The selective decoder 160 decodes the received inter-coded and intra-coded video data. In some embodiments, the received data comprises an inter-coded version of a portion of video data and an intra-coded version of the portion of video data. Inter-coded data can be decoded after the reference data upon which it was predicted is decoded. For example, data encoded using motion compensated prediction comprises a motion vector and a frame identifier identifying the location of the reference data. If the portion of the reference frame identified by the motion vector and the frame identifier of the inter-coded version is available (e.g., already decoded), then the selective decoder 160 can decode the inter-coded version. If however, the reference data is not available, then the selective decoder 160 can decode the intra-coded version.

The reference data determiner 162, in one aspect, identifies received reference data that indicates where the intra-coded and inter-coded video data in the received encoded video data are located. For example, the reference data may include identifiers of subblocks and/or macroblocks that are used by the selective decoder 160 to locate a position within a frame. The reference data may also include a frame sequence number used to locate a frame within a video frame sequence. Using this received reference data enables a decoder to determine if the reference data upon which inter-coded data depends is available.

Reference data availability can be affected by a user switching a channel of a multi-channel communication system. For example, multiple video broadcasts may be available to the receiver 158, using one or more communication links. If a user commands the receiver 158 to change to a different broadcast channel, then reference data for the inter-coded data on the new channel may not be immediately available. The channel switch detector 164 detects that a channel switch command has been issued and signals the selective decoder 160. Selective decoder 160 can then use information obtained from the reference data determiner to identify if reference data of the inter-coded version is unavailable, and then identify the location of the nearest intra-coded version and selectively decode the identified intra-coded version.

Reference data availability can also be affected by errors in the received video data. The error detector 166 can utilize error detection techniques (e.g., forward error correction) to identify uncorrectable errors in the bitstream. If there are uncorrectable errors in the reference data upon which the inter-coded version depends, then the error detector 166 can signal the selective decoder 160 identifying which video data are affected by the errors. The selective decoder 160 can then determine whether to decode the inter-coded version (e.g., if the reference data is available) or to decode the intra-coded version (e.g., if the reference data is not available).

In certain embodiments, one or more of the elements of the encoder device 110 of FIG. 2A may be rearranged and/or combined. The elements may be implemented by hardware, software, firmware, middleware, microcode or any combination thereof. In certain embodiments, one or more of the elements of the decoder device 150 of FIG. 2B may be rearranged and/or combined. The elements may be implemented by hardware, software, firmware, middleware, microcode or any combination thereof.

Certain embodiments of this disclosure can be implemented, for example, using MediaFLO™ video coding for delivering realtime video services in TM3 systems using the FLO Air Interface Specification, "Forward Link Only [FLO] Air Interface Specification for Terrestrial Mobile Multimedia Multicast", published as Technical Standard TIA-1099, August 2006, which is fully incorporated herein by reference for all purposes.

The encoder device 110 carries out an efficient process for use by the intra-coding encoder 120 for determining if a macroblock can be spatially predicted with adequate accuracy/quality according to H.264 intra__4×4 prediction specification. The process used by the intra-coding encoder 120 of the encoder device 110 provides coding into bitstream image information comprising a plurality of image subblocks using one or more of a plurality of spatial prediction modes for intra-mode block prediction, wherein the spatial prediction mode of a current subblock is determined based on an estimated prediction mode. As will be determined from the description below, the estimating error is significantly reduced to provide a highly accurate prediction mode estimate.

Fundamentally additions, subtractions and absolute value operations are utilized by the intra-coding encoder 120 of the encoder device 110. Only a very small number of integer divisions are required (exact operation counts can be provided upon request. Exact operation counts will vary in different embodiments, however they are straightforward to calculate. Furthermore, no sorting/binning is necessary. As will be seen from the description below, the process 900 is performed in stages to estimate prediction modes of a set of subblocks. The first stage provides for a very accurate estimation of a first subset of prediction modes using a first pixel subset having a first grid arrangement. A second stage provides for a very accurate estimation of a second subset of prediction modes which are different from the first subset of prediction modes using a second pixel subset having a second grid arrangement angularly offset forth the first grid arrangement. A third stage employs the first pixel subset having the first grid arrangement and the second pixel subset having the second grid arrangement to interpolate a third subset of prediction modes.

In addition to establishing an estimator/metric for the expected success of intra__4×4 prediction applied to a macroblock, the process 900 carried out by the intra-coding encoder 120 of the encoding device 110 provides directivity hints which can be later used to advantageously speed-up the determination of the final intra__4×4 prediction modes if the macroblock mode decision logic decides to use intra__4×4 coding for the luminance channel of the macroblock.

The purpose and the real efficiency enabler in the embodiments described herein is being able to identify a consistent directional structure in the signal which is present at a scale larger than 4×4 subblocks, in a simple and fast manner rather than diving into 4×4 processing right away (in a blind manner kind of ruling out the possibility of a uniformity/structure existing at a larger scale). Thus, if an 8×8 subblock is used for a 4×4 intra prediction mode, then the same mode identified for the 8×8 subblock is used for 4-4×4 subblocks in the same overlapping area as the 8×8 subblock.

In one aspect, a 8×8 subblock partition size may be chosen as a reasonable trade-off between reducing computational complexity and still maintaining a high frequency of occurrence for subblocks with a consistently present directional structure or smoothness for that matter. Note that increasing the subblock size (beyond 8×8) will reduce the probability of encountering (in statistical terms) subimages with a uniform directional structure or smoothness, as more detail of the signal will be captured by these larger areas. Hence, if and when a consistently present directional structure or smoothness at the 8×8 scale is identified, then it may be assumed its applicability to all (four) 4×4 subblocks present within that 8×8 region.

Through a secondary analysis consequent to and making use of the results of the process 900 described herein below, an encoder device 110 can also assess the Rate-Distortion merit of using intra__16×16 coding on the luminance channel of the same macroblock. In a manner similar to intra__16×16 spatial prediction mode assessment for the luminance channel, the intra__8×8 mode's expected success can be evaluated for the chroma channels.

Rate-Distortion (R-D) analysis provides a framework for an encoder device 110 to choose macroblock coding modes in an optimal way. An encoder device 110 will attempt to reduce both the distortion introduced by lossy compression algorithms and the bit rate required to represent the visual information in its compressed form. These two are conflicting goals and the Rate-Distortion (R-D) framework defines a composite cost metric which captures both the distortion and the bitrate dimensions of the challenge and which is to be minimized by the encoder device 110. The brute-force approach of evaluating the R-D cost metric for all allowed macroblock coding modes is computationally prohibitive for most real-time encoder devices. Hence, reduced complexity algorithms enabling efficient determination of the best coding modes to utilize, are invaluable.

The H.264 standard provides two types of intra prediction for the luminance channel pixel subblocks. The first type is intra__4×4 prediction which supports the spatial prediction of 4×4 sized subblocks in nine (9) different direction modes. This type is better suited for image regions which exhibit considerable detail at smaller scales. The second type is intra__16×16 prediction which supports the spatial prediction of 16×16 sized subblocks i.e. entire macroblocks, in 4 different direction modes. This type is more appropriate for use in image regions which exhibit smoothness or uniformly present vertical or horizontal detail at the 16×16 scale. Both chroma channels U (Cb) and V (Cr) typically exhibit considerably lower spatial detail (variation) compared to the luminance channel. This is the fundamental reason behind the common use of 4:2:0 chroma subsampling format in video compression standards through which the spatial resolution of the original chroma information is reduced by half both horizontally and vertically prior to compression.

Based on this relative smoothness of the chroma channels in comparison to the luminance channel, the H.264 standard provided only one type of intra prediction for the chroma channel pixel blocks. The intra__8×8 prediction defined for chroma channel pixel blocks supports the spatial prediction of 8×8 sized subblocks in 4 different direction modes which are analogous to the 4 direction modes of intra__16×16 prediction type for luminance channel. It is important to note that intra macroblocks do not only exist in I type coded frames but an encoder device 110 may decide to utilize intra macroblocks in both P and B type coded frames when the temporal motion compensated prediction process fails to identify satisfactory references for inter coding. Therefore intra predictability assessment becomes an important concern for macroblock mode decision in all frame coding types. When implemented in a straightforward brute force manner, the assessment of intra__4×4 coding for a luminance macroblock (of 16×16 pixel values) existing in an I, P or B type slice, requires the generation of 16×9=144 4×4 predictor signals, their consequent residual signals, and the estimation of the resulting composite R-D costs. This usually is a formidable computational burden on a real-time encoder device.

Most significantly, the encoder device 110 is capable of accurately detecting, classifying and reporting directional properties of sub-macroblock regions whereas histogram-based methods are not able to preserve and utilize directivity attributes of the underlying signal. It is possible to synthesize two image segments with identical or very similar histograms, where one segment exhibits a clear directional structure (and therefore possesses decent spatial predictability) whereas the other segment is more like a texture with no clear directivity or smoothness, and therefore is not amenable to successful intra prediction.

Intra Prediction

Figure 3B:
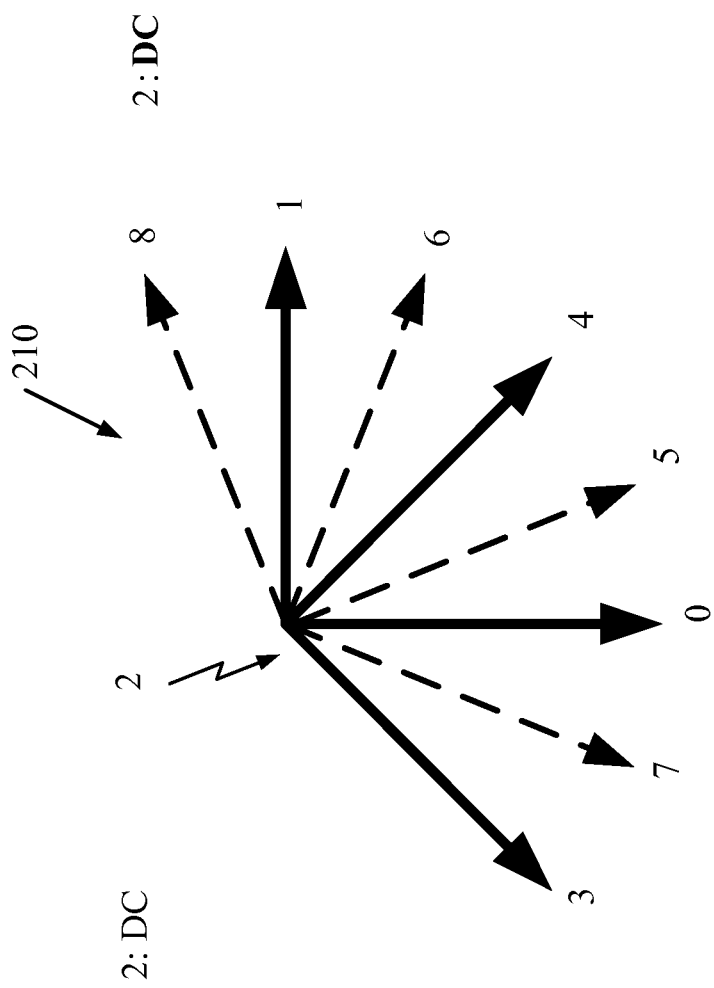
FIG. 3B illustrates grouped directivity classes according to certain embodiments.
Figure 3A:
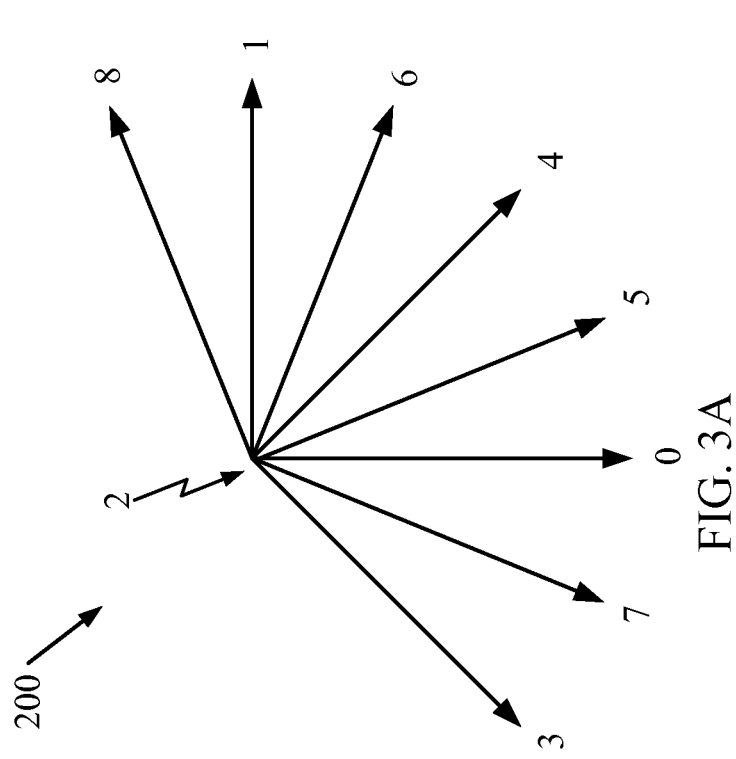
FIG. 3A illustrates intra_4×4 prediction modes in H.264.

FIG. 3A illustrates intra_4×4 prediction modes 200 in H.264 according to certain embodiments. Intra (4×4) prediction in H.264 utilizes the underlying signal's directional predictability attribute within 4×4 blocks and along the 8 directivity classes illustrated by the vectors 0-8 in FIG. 3A. For smooth signals with no clear directivity, Mode {2} (DC) is provisioned. In FIG. 3A, a vertical directivity is selected based on the vertical vector 0 wherein vector 0 corresponds to Mode {0}. The horizontal directivity is selected based on the horizontal vector 1 wherein vector 1 corresponds to Mode {1}. In the example, vectors 7 and 5 have directivity which are generally offset from vector 0 by 22.5° and correspond to Modes {7 and 5}. Vector 3 (Mode {3}) has a directivity which is offset 45° from the vector 0. Likewise, vector 4 (Mode {4}) has a directivity which is offset 45° from the vector 0 (Mode {0}) or vector 1 (Mode {1}). Vector 8 (Mode {8}) has a directivity which is offset from the horizontal vector 1 by 22.5°.

FIG. 3B illustrates grouped directivity classes 210 according to certain embodiments. The grouped directivity classes 210 in FIG. 3B correspond directly to the Modes {0-8} above in FIG. 3A according to the H.264 standard and will not be described further in relation to the Modes and the angular relationship between each vector. However, in one aspect, the eight (8) directivity classes 210 are oriented into four (4) groups for intra prediction in accordance with certain configurations described herein. These four groups include: (1) a rectangular group having vectors {0,1}; (2) a diagonal group having vectors {3,4}; (3) an oblique group having {5,6,7,8}; and (4) a smooth group at point {2}. The vectors {5, 6, 7, and 8} of the oblique group have dashed lines. Vector 5 is 22.5° from vector 0 and 4; 45° from vectors 6 and 7; and 90° from vector 8, vector 6 is 22.5° from vector 1 and 4; 45° from vector 8 and vector 5; and 90° from vector 7. The vectors {0,1} of the rectangular group are offset forth each other by 90°; and vectors {0,1} are 45° from vector 4. Vector 0 is 45° from vectors 3 and 4.

Figure 4:
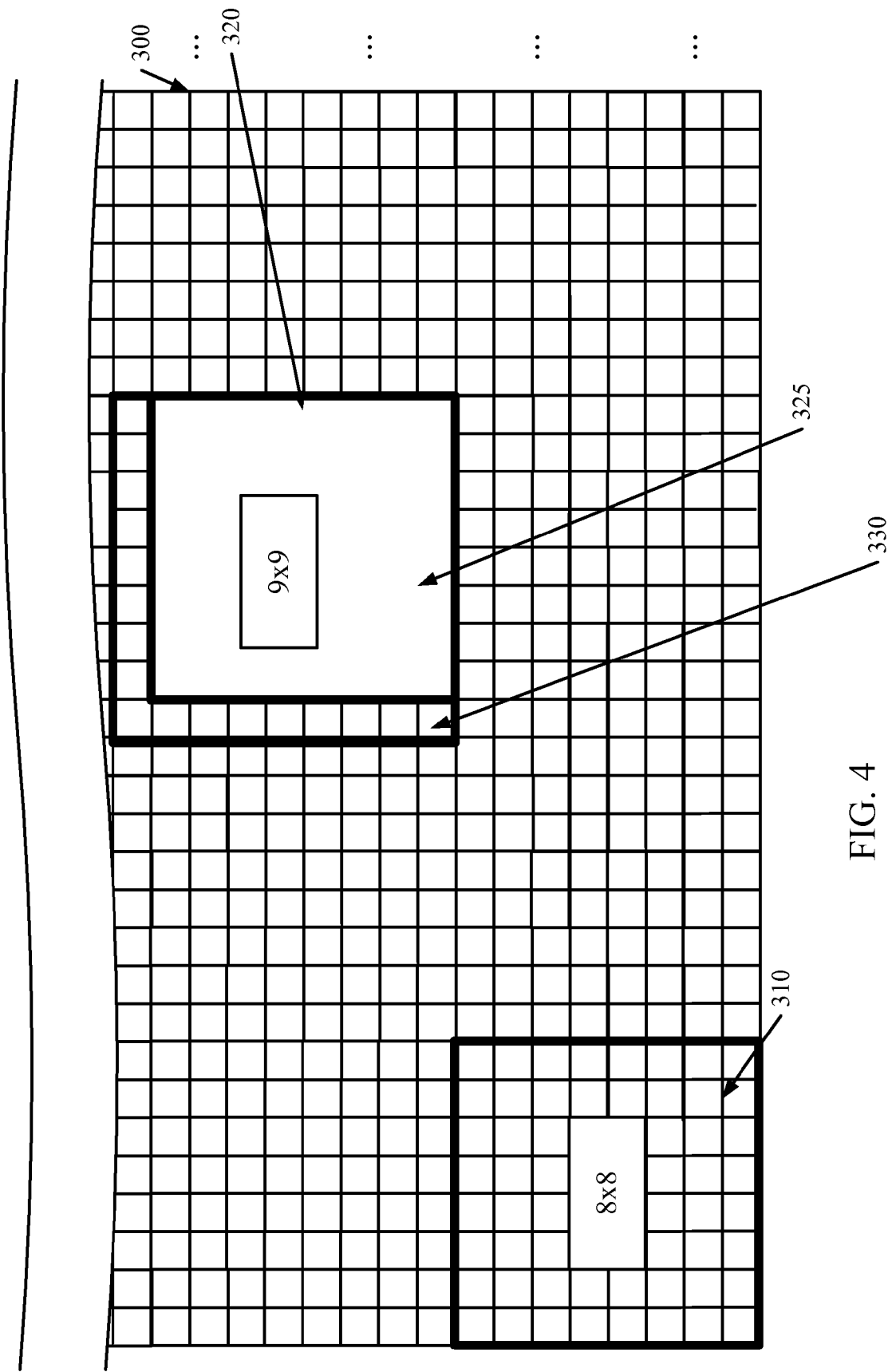
FIG. 4 illustrates a partial view of an intra (I)-frame according to certain embodiment.

FIG. 4 illustrates a partial view of an intra (I)-frame 300 according to certain embodiment. In one aspect, frame 300 is divided into a plurality of border subblocks 310 (only one shown). The border subblock 310 is an 8×8 subblock located on the left edge or border of I-frame 300. The 8×8 subblock has 64 squares representing its constituent pixels within the 8×8 box from which a first pixel subset is selected. In one aspect 16 pixels are selected for the first pixel subset. The border subblocks 310 do not all have upper and/or left neighbors which are permissible for use in predicting the directivity prediction mode because the I-frame ends at its perimeter edge or border of the I-frame 300.

The interior subblock 320 is a 9×9 subblock comprised of a main 8×8 subblock 325 denoted without any squares within the main box. The outer box encompasses the main box and a column of squares (i.e. pixels) to the left perimeter edge or border of the main 8×8 subblock 325. The column of squares to the left perimeter or border represents left neighbors. Likewise, the outer box encompasses an upper row of squares (i.e. pixels) above the perimeter edge or border of the main 8×8 subblock 325. The upper row of squares represents the upper neighbors.

Figure 5B:
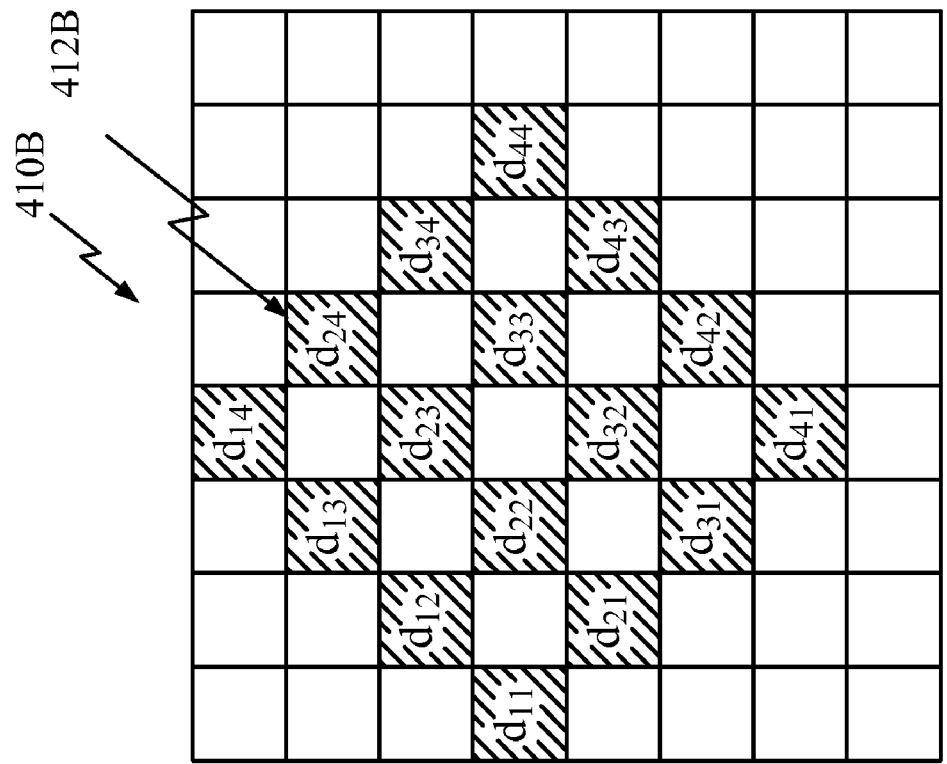
FIG. 5B illustrates a second pixel subset for a border subblock according to certain embodiment.
Figure 5A:
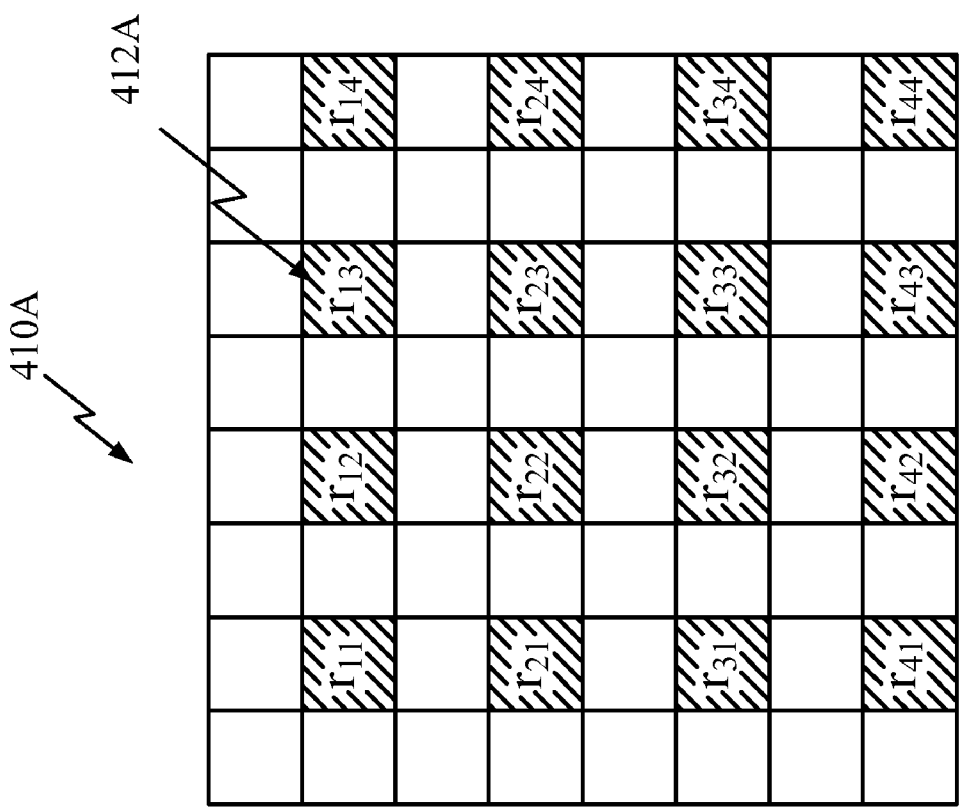
FIG. 5A illustrates a first pixel subset for a border subblock according to certain embodiments.

FIG. 5A illustrates a first pixel subset for a border subblock 410A according to certain embodiments. In one aspect, the pixels for the first pixel subset are not selected from the first (far left) column and the first (uppermost) row of the border subblock 410A. The pixels of the first pixel subset are selected to form a rectangular grid 412A. The rectangular grid 412A includes pixels $r_{11}, r_{12}, r_{13}, r_{14}, r_{21}, r_{22}, r_{23}, r_{24}, r_{31}, r_{32}, r_{33}, r_{34}, r_{41}, r_{42}, r_{43}$, and $r_{44}$ arranged in alternating rows and columns. For example, $r_{11}, r_{12}, r_{13}$, and $r_{14}$ are aligned in a second row of the 8×8 subblock 410A with one non-selected pixel spacing between each selected pixel. The pixels $r_{21}, r_{22}, r_{23}$, and $r_{24}$ are also arranged in a fourth row with one non-selected pixel between each selected pixel. Likewise, the pixels $r_{31}, r_{32}, r_{33}$, and $r_{34}$ are also arranged in a sixth row with one non-selected pixel between each selected pixel. The pixels $r_{41}, r_{42}, r_{43}$, and $r_{44}$ are also arranged in an eighth row with one non-selected pixel between each selected pixel.

As can be readily seen, the selected pixels of each row share columns such that a column with selected pixels is immediately adjacent a column with only non-selected pixels. Moreover, those rows with selected pixels are separated by a row of only non-selected pixels. In this configuration, no side or corner of a selected pixel touches or is immediately adjacent to another selected pixel in the subset. As will be described in detail later, the rectangular grid 412A of the selected pixels is used to accurately predict the directivity corresponding to vectors {0} and {1} in a first directivity prediction stage (STAGE 1, FIG. 7).

FIG. 5B illustrates a second pixel subset for a border subblock 410B according to a certain embodiment. In one aspect, the pixels for the second pixel subset are not selected from the last (right most) column and the last (lowermost) row of the border subblock 410B. The pixels of the second pixel subset are selected to form a diagonal grid 412B. The diagonal grid 412B includes pixels $d_{11}, d_{12}, d_{13}, d_{14}, d_{21}, d_{22}, d_{23}, d_{24}, d_{31}, d_{32}, d_{33}, d_{34}, d_{41}, d_{42}, d_{43}$, and $d_{44}$ arranged in diagonally aligned rows. For example, $d_{11}, d_{12}, d_{13}$, and $d_{14}$ are aligned in a fourth diagonal row of the 8×8 subblock 410A. The fourth diagonal row has four squares (i.e. pixels). An upper right corner of pixel $d_{11}$ touches a lower left corner of pixel $d_{12}$. An upper right corner of pixel $d_{12}$ touches a lower left corner of pixel $d_{13}$. Likewise, upper right corner of pixel $d_{13}$ touches a lower left corner of pixel $d_{14}$. Thus, in this configuration only pixel $d_{11}$ is selected from the first (far left) column and $d_{14}$ is the only selected pixel in the first (uppermost) row.

The immediately adjacent diagonal row has only non-selected pixels. The next diagonal row has pixels $d_{21}, d_{22}, d_{23}$, and $d_{24}$ which are arranged to touch corners in the manner described above in relation to $d_{11}, d_{12}, d_{13}, d_{14}$. Additionally, the upper left corners of pixels $d_{21}, d_{22}, d_{23}$, and $d_{24}$ touch the lower right corner of pixels $d_{11}, d_{12}, d_{13}$, and $d_{14}$, respectively. The diagonal row immediately adjacent pixels $d_{21}, d_{22}, d_{23}$, and $d_{24}$ has only non-selected pixels. The next diagonal row has pixels $d_{31}, d_{32}, d_{33}$, and $d_{34}$ arranged in a similar manner as described in relation to pixels $d_{21}, d_{22}, d_{23}$, and $d_{24}$. The next diagonal row adjacent the diagonal row with pixels $d_{31}, d_{32}, d_{33}$, and $d_{34}$ has only non-selected pixels. The next diagonal row includes pixels $d_{41}, d_{42}, d_{43}$, and $d_{44}$ arranged in a similar manner as described in relation to pixels $d_{21}, d_{22}, d_{23}$, and $d_{24}$ except that the right corners touch non-selected pixels. As can be readily seen, the selected pixels in the diagonal have 2, 3 or 4 corners of which touch corners of adjacent selected pixels. As will be described in detail later, the diagonal grid 412B of selected pixels are used to accurately predict the directivity corresponding to vectors {3} and {4} in a second directivity prediction stage (STAGE 2, FIG. 7).

Figure 6B:
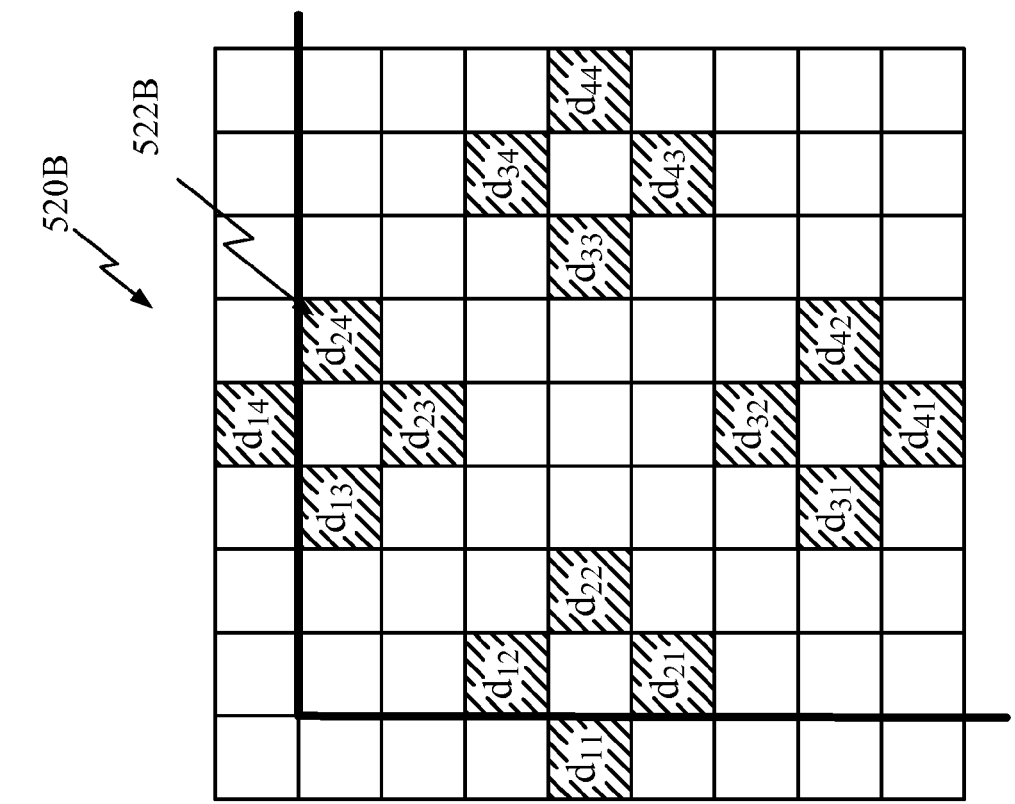
FIG. 6B illustrates a second pixel subset for an interior subblock according to certain embodiments.
Figure 6A:
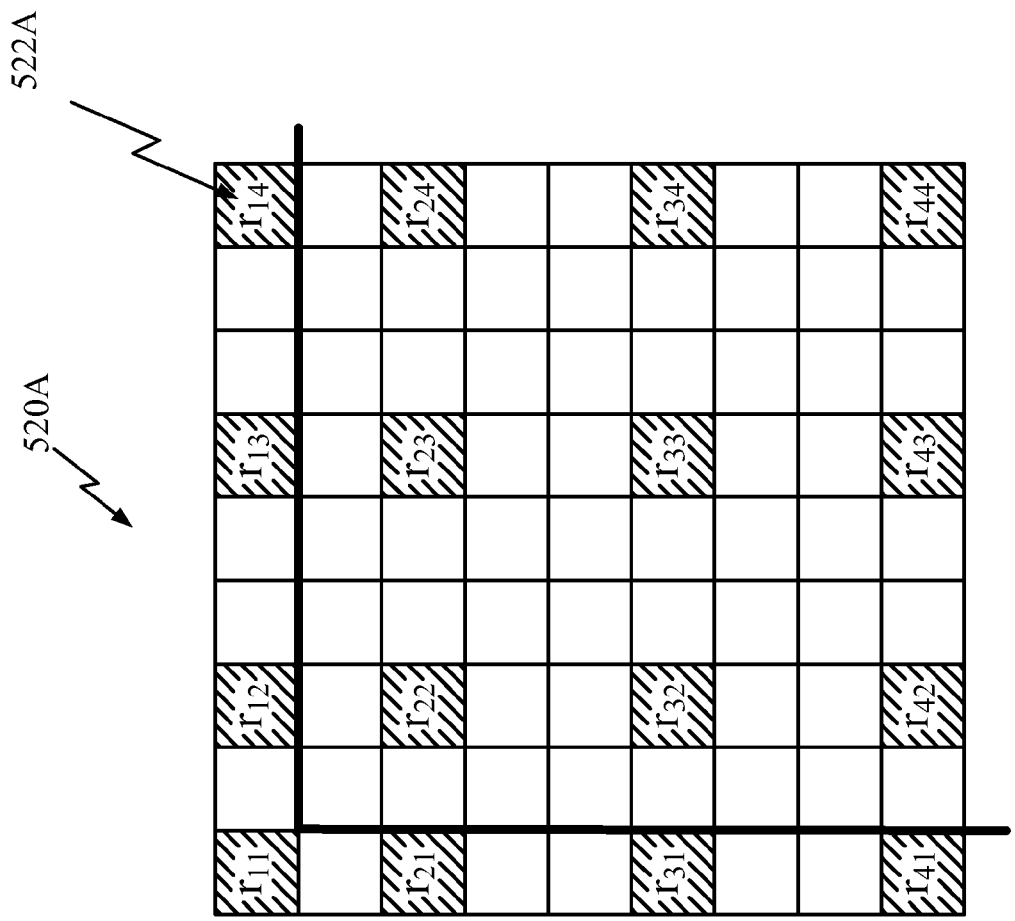
FIG. 6A illustrates a first pixel subset for an interior subblock according to certain embodiments.

FIG. 6A illustrates a first pixel subset for an interior subblock 520A according to certain embodiments where upper and left neighbors are both available and shows a second rectangular grid 522A. The rectangular grid 412A of FIG. 5A and the second rectangular grid 522A of FIG. 6A are used where appropriate by the encoder device 110 for various subblocks in the I-frame 300 to enhance the accuracy of the estimation of directivity as a function of available left and upper neighbors.

In one aspect, some of the pixels for the first pixel subset are selected from the first (far left) column and the first (uppermost) row of the interior subblock 520A. The pixels of the first pixel subset are selected to form the second rectangular grid 522A when the left and upper neighboring pixels are available. The second rectangular grid 522A includes pixels $r_{11}, r_{12}, r_{13}$, and $r_{14}$ arranged in the first uppermost row. In one aspect there is one non-selected pixel between pixels $r_{11}$ and $r_{12}$. There are two non-selected pixels between pixels $r_{12}$ and $r_{13}$ and between pixels $r_{13}$ and $r_{14}$. The first (far left) column in the subblock 520A has selected pixels $r_{11}, r_{21}, r_{31}$ and $r_{41}$. In one aspect there is one non-selected pixel between pixels $r_{11}$ and $r_{21}$. There are two non-selected pixels between pixels $r_{21}$ and $r_{31}$ and between pixels $r_{31}$ and $r_{41}$.

There is one row of only non-selected pixels between the row with selected pixels $r_{11}, r_{12}, r_{13}$ and $r_{14}$ and the row of selected pixels $r_{21}, r_{22}, r_{23}$ and $r_{24}$. There are two rows of only non-selected pixels between the row with selected pixels $r_{21}$, $r_{22}, r_{23}$, and $r_{24}$ and the row of selected pixels $r_{31}, r_{32}, r_{33}$, and $r_{34}$. Likewise, there are two rows of only non-selected pixels between the row with selected pixels $r_{31}, r_{32}, r_{33}$, and $r_{34}$ and the row of selected pixels $r_{41}, r_{42}, r_{43}$, and $r_{44}$.

Figure 7:
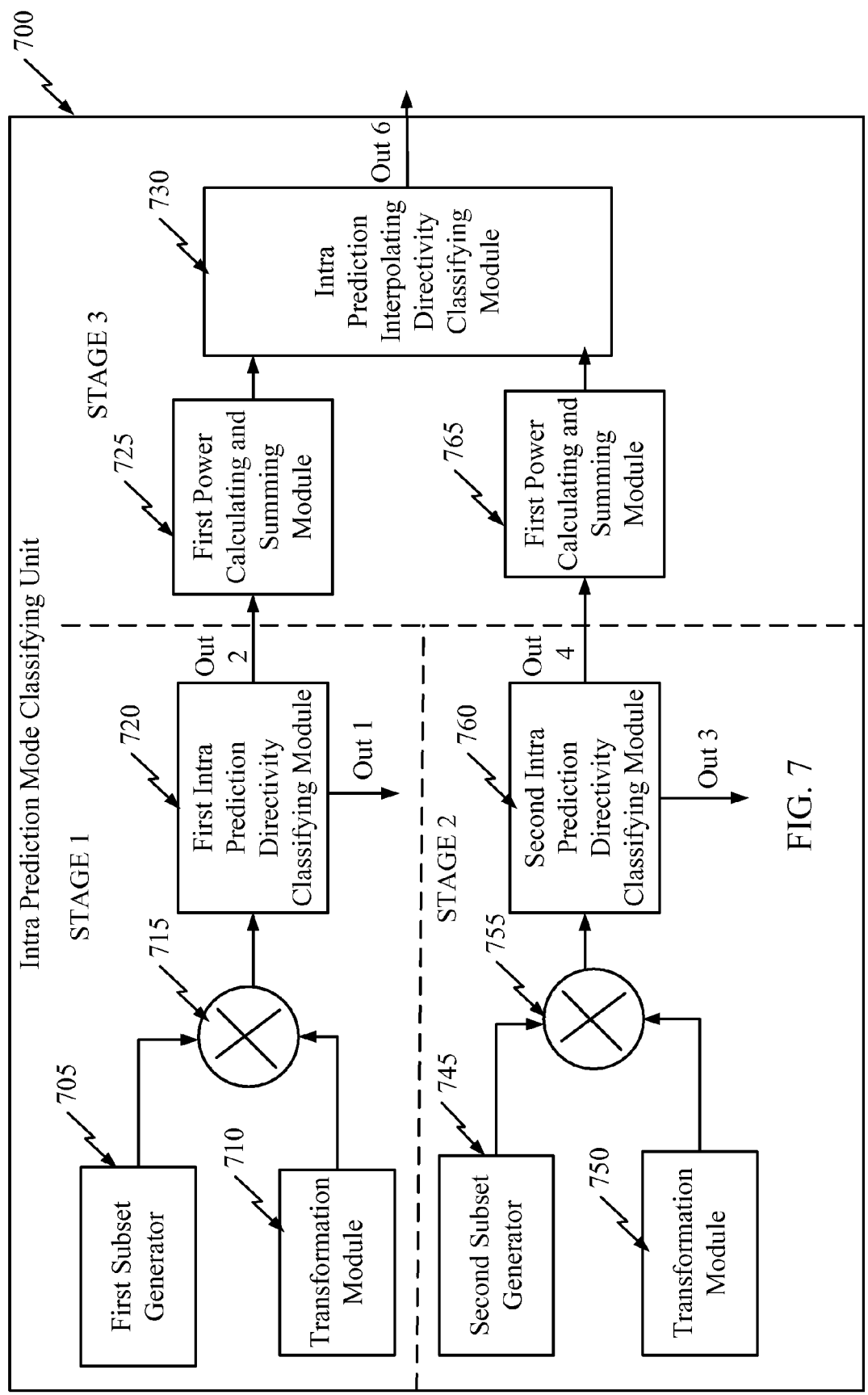
FIG. 7 illustrates a block diagram of an intra prediction mode classifying unit according to certain embodiments.

The row pixels $r_{21}, r_{22}, r_{23}$, and $r_{24}$ align with pixels $r_{11}, r_{12}, r_{13}$ and $r_{14}$. Likewise, the pixels $r_{31}, r_{32}, r_{33}$, and $r_{34}$ and the pixels $r_{41}, r_{42}, r_{43}$, and $r_{44}$ are also aligned with pixels $r_{11}, r_{12}, r_{13}$ and $r_{14}$. As can be readily seen, the selected pixels of each row share columns such that a column with selected pixels is immediately adjacent to one or more columns with only non-selected pixels. Moreover, those rows with selected pixels are separated by one or more rows of only non-selected pixels. In this configuration, no border or edge of the subblock 520A is without at least one selected pixel. In this configuration, no side or corner of a selected pixel touches or is immediately adjacent another selected pixel in the subset. As will be described in detail later, the second rectangular grid 522B of selected pixels are used to accurately predict the directivity corresponding to vectors {0} and {1} in STAGE 1 (FIG. 7).

FIG. 6B illustrates a second pixel subset for an interior subblock 520B according to certain embodiments where upper and left neighbors are both available, and shows diagonal grid 522B. The interior subblock 520B is a 9×9 subblock. The diagonal grid 522B includes pixels $d_{11}, d_{12}, d_{13}, d_{14}, d_{21}$, $d_{22}, d_{23}, d_{24}, d_{31}, d_{32}, d_{33}, d_{34}, d_{41}, d_{42}, d_{43}$, and $d_{44}$ arranged in diagonally aligned rows.

The diagonal grid 522B has pixels $d_{11}, d_{12}, d_{13}, d_{14}$ diagonally aligned in a fifth diagonal row of the subblock 520B. The pixel $d_{11}$ is in the fifth row, first (far left) column of the subblock 520B. The diagonal grid 522B has a pixel $d_{14}$ in the fifth column in the first (uppermost) row of the subblock 520B. Pixel $d_{12}$ touches the upper right corner of pixel $d_{11}$ and pixel $d_{21}$ touches a bottom right corner of $d_{11}$. Pixel $d_{13}$ touches the lower left corner of pixel $d_{14}$ and pixel $d_{24}$ touches a bottom right corner of $d_{14}$. Pixel $d_{22}$ touches the lower right corner of pixel $d_{12}$ and the upper right corner of $d_{21}$. In one aspect, there is one non-selected pixel in the fifth diagonal row between $d_{12}$ and $d_{13}$.

There is one diagonal row of only non-selected pixels between the fifth and seventh diagonal rows. The seventh diagonal row has pixels $d_{21}, d_{22}, d_{23}$, and $d_{24}$ where one non-selected pixel exists between pixels $d_{22}$ and $d_{23}$. There are one or more diagonal rows between pixels $d_{21}, d_{22}, d_{23}$, and $d_{24}$ and pixels $d_{31}, d_{32}, d_{33}$, and $d_{34}$.

The diagonal grid 522B has a pixel $d_{41}$ in the fifth column in the last (lowermost) row of the subblock 520B. The diagonal grid 522B has a pixel $d_{44}$ in the fifth row in the last (rightmost) column of the subblock 520B. Pixel $d_{32}$ touches the upper right corner of pixel $d_{31}$ and pixel $d_{41}$ touches a bottom right corner of $d_{31}$. Pixel $d_{33}$ touches the lower left corner of pixel $d_{34}$ and pixel $d_{44}$ touches a bottom right corner of $d_{34}$. Pixel $d_{42}$ touches the lower right corner of pixel $d_{32}$ and the upper right corner of $d_{41}$. In one aspect, there is one non-selected pixel diagonally between pixels $d_{32}$ and $d_{33}$ and likewise between pixels $d_{42}$ and $d_{43}$.

Figure 6C:
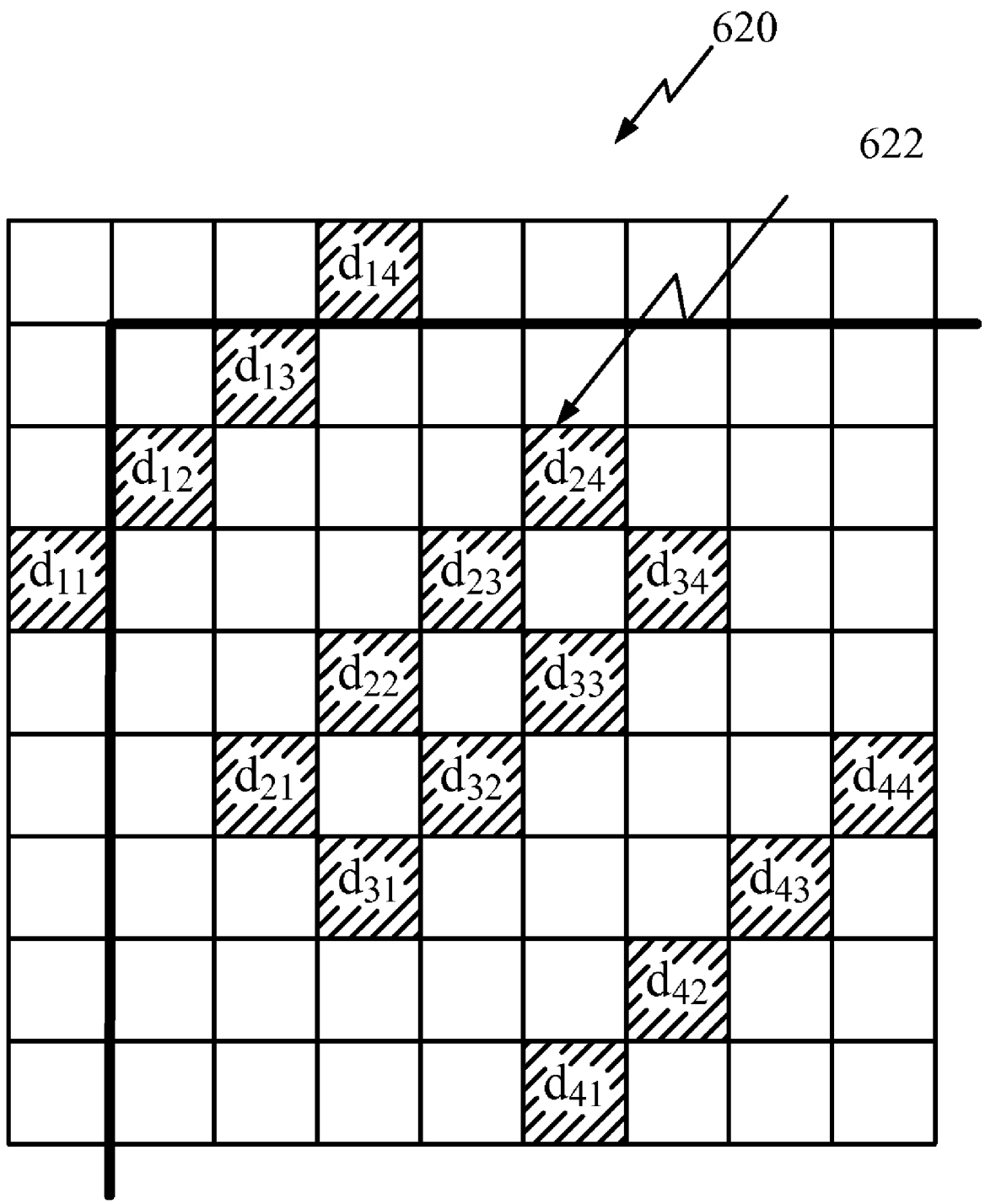
FIG. 6C illustrates an alternate configuration of a second pixel subset for an interior subblock according to certain embodiments.

FIG. 6C illustrates an alternate configuration of a second pixel subset for an interior subblock 620 according to certain embodiments where upper and left neighbors are both available and shows another diagonal grid configuration. In one aspect, one or more of the pixels for the second pixel subset may be selected from the last (right most) column and the last (lowermost) row of the interior subblock 620. The pixels of the second pixel subset are selected to form a diagonal grid 622. The diagonal grid 622 includes pixels $d_{11}, d_{12}, d_{13}, d_{14}$, $d_{21}, d_{22}, d_{23}, d_{24}, d_{31}, d_{32}, d_{33}, d_{34}, d_{41}, d_{42}, d_{43}$, and $d_{44}$ arranged in diagonally aligned rows. For example, $d_{11}, d_{12}$, $d_{13}$, and $d_{14}$ are aligned in a fourth diagonal row of the 9×9 subblock 620. The fourth diagonal row has four squares (i.e. pixels). An upper right corner of pixel $d_{11}$ touches a lower left corner of pixel $d_{12}$. An upper right corner of pixel $d_{12}$ touches a lower left corner of pixel $d_{13}$. Likewise, upper right corner of pixel $d_{13}$ touches a lower left corner of pixel $d_{14}$. Thus, in this configuration only pixel $d_{11}$ is selected from the first (far left) column beginning at the fourth row and $d_{14}$ is the only selected pixel in the first (uppermost) row.

There is at least one immediately adjacent diagonal row which has only non-selected pixels. In this aspect, there are three diagonal rows between. the two diagonal rows with pixels $d_{21}, d_{22}, d_{23}$, and $d_{24}$ and pixels $d_{11}, d_{12}, d_{13}, d_{14}$. Additionally, the upper left corners of pixels $d_{21}, d_{22}, d_{23}$, and $d_{24}$ has one non-selected pixel between the lower right corner of pixels $d_{11}, d_{12}, d_{13}$, and $d_{14}$, respectively. The next diagonal row immediately adjacent pixels $d_{21}, d_{22}, d_{23}$, and $d_{24}$ has only non-selected pixels. The next diagonal row has pixels $d_{31}, d_{32}, d_{33}, d_{34}$ arranged in a similar manner as described in relation to pixels $d_{21}, d_{22}, d_{23}$, and $d_{24}$. The one or more next diagonal row adjacent to the diagonal row with pixels $d_{31}, d_{32}$, $d_{33}, d_{34}$ has only non-selected pixels followed by diagonal row having pixels $d_{41}, d_{42}, d_{43}$, and $d_{44}$. As can be readily seen, the selected pixels $d_{21}, d_{22}, d_{23}$, and $d_{24}$ each have a lower right corner which touches pixels $d_{31}, d_{32}, d_{33}, d_{34}$, respectively. As will be described in detail later, the diagonal grid 622 of selected pixels are used to accurately predict the directivity corresponding to vectors {3} and {4} in STAGE 2 (FIG. 7). As can be readily seen, the first pixel subset arranged in the rectangular (sampling) grid and the second pixel subset arranged in the diagonal (sampling) grid of FIGS. 5A and 5B or FIGS. 6A and 6B (or alternately FIG. 6C) together form an oblique (sampling) grid arrangement.

FIG. 7 illustrates a block diagram of an intra prediction mode classifying unit 700 according to certain embodiments for use by the encoder device 110. The intra prediction mode classifying unit 700 includes, at STAGE 1, a first subset generator 705 which generates the appropriate rectangular grid 412A or 522A of pixels (FIG. 5A or 6A) for a corresponding current subblock in the I-frame 300. The first subset generator 705 generates a first pixel subset, for example, 16 pixels for those border subblocks using a rectangular grid 412A for a border 8×8 subblock. Furthermore, the first subset generator 705 generates a first pixel subset, for example, 16 pixels for those interior subblocks using a rectangular grid 522A for an interior 9×9 subblock.

The intra prediction mode classifying unit 700 further includes a transformation module 710 having a Fourier-like transform, such as without limitation a Hadamard transform, with 16 coefficients as will be described in more detail later. The output (matrix) of the first subset generator 705 is subjected to a two-dimensional (2-D) transform operation by the transform operator (in one aspect pre- and post-matrix multiplication) 715 with the Fourier-like transform of the transformation module 710. The output of the transform operator 715 is sent to a first intra prediction directivity classifying (IPDC) module 720. The first IDPC module 720 produces at least one output Out 1 and Out 2. If the first IPDC module 720 evaluates the results from the transform operator 715 and determines that a vector {0} or {1} has been predicted for the currently evaluated subblock, then the operation or processing for that current subblock may end. The Mode {0} or {1} is sent to Out 1 and may be used in generating the bitstream information related to the coding by the encoder device 110.

Once the mode information is conclusively determined/estimated, then the encoder will actually perform the corresponding prediction operation i.e. generate the predictor signal corresponding to the determined spatial direction (including no-specific-direction for DC prediction), subtract the predictor signal from the original 4×4 subblock's pixel values to determine the residual signal, (forward) transform (integer transform approximation to 4×4 DCT) and quantize the residual signal and hence determine the resulting quantization indices. Consequently the encoder will write, all in entropy coded manner, the intra-prediction mode information and resultant quantization indices to the bitstream.)

In one aspect, if Mode {2} is determined then the operation or evaluation of the current subblock may also end. In STAGE 1, if Mode {0} or {1} or {2} are determined, the probability of error for such determination is very low if not almost 0.

However, if the first IPDC module 720 evaluates the results from the transform operator 715 and determines that none of the Modes {0, 1 and 2} have been (clearly/unambiguously) predicted for the currently evaluated subblock, then the current subblock is evaluated for Modes {3} and {4} using a second pixel subset in the current subblock in a second stage STAGE 2.

At STAGE 2, the intra prediction mode classifying unit 700 includes a second subset generator 745 which generates the appropriate diagonal grid 412B, 522B or 622 of pixels (FIG. 5B, 6B or 6C) for the corresponding current subblock in the I-frame 300. This current subblock is the same subblock used to generate the first pixel subset. The second subset generator 745 generates, for example, 16 pixels for those border subblocks using a diagonal grid 412B for a border 8×8 subblock. Furthermore, the first subset generator 745 generates, for example, 16 pixels for those interior subblocks using the diagonal grid 522B or 622 for an interior 9×9 subblock.

The intra prediction mode classifying unit 700 further includes a transformation module 750 having a Fourier-like transform, such as without limitation a Hadamard transform, with 16 coefficients as will be described in more detail later. The transformation module 750 may be separate from or the same as the transformation module 710. The output (matrix) of the second subset generator 745 is subjected to a two-dimensional (2-D) transform operation by the transform operator 755 (in one aspect comprising a pre- and post matrix multiplication) with the Fourier-like transform of the transformation module 750. The output of the transform operator 755 is sent to a second intra prediction directivity classifying module 760. The second intra prediction directivity classifying (IPDC) module 760 produces one of two outputs Out 3 and Out 4. If the second IPDC module 760 evaluates the results from the transform operator 755 and determines that a vector {3} or {4} (FIG. 3A or FIG. 3B) has been predicted for the currently evaluated subblock, then the operation or processing for that current subblock may end. The Mode {3} or {4} is sent for use in the generation of bitstream information related to the coding by the encoder device 110. In one aspect, if Mode {2} is determined then the operation or evaluation of the current subblock may also end. In STAGE 2, if Mode {3} or {4} or {2} is determined, the probability of error for such determination is very low if not almost 0.

In view of the above description, the operations for detecting Modes {0, 1 or 2} may be performed after the operations for detecting Modes {3, 4 or 2}. The estimation of these modes is a function of the arrangement of the pixel subsets. In one aspect, an encoder device in an effort to reduce its total computation time for encoding a macroblock, may prefer to change the orders of operations for detecting Modes {0, 1 or 2} and Modes {3, 4, or 2}, giving priority to i.e. moving to the first stage, the execution of the operations for detecting those modes which are more likely to hold based on the already determined modes of neighboring subblocks.

The first IPDC module 720 and the second IPDC module 760 each provide a hint for interpolating one of the vectors or modes from the oblique group, vectors {5}, {6}, {7} and {8} in FIG. 3B. The first IPDC module 720 and the second IPDC module 760 are followed by a first power calculating and summing (PCS) module 725 and a second PCS module 765, respectively, in a third stage (STAGE 3). In operation, the results of the first and second PCS modules 725 and 765 are sent to an intra prediction interpolating directivity classifying (IPIDC) module 730 of STAGE 3. The IPIDC module 730 compares the results from the first PCS module 725 with the results of the second PCS module 765 to interpolate the results to classify the result corresponding to the directivity of one of vectors {5, 6, 7, or 8} for selecting one of Modes {5, 6, 7, or 8} of the current subblock at STAGE 3. The vectors 5, 6, 7 and 8 are 22.5° from vectors 0, 1, 3 and 4. The IPIDC module 730 produces output Out 6.

Hadamard Transform

The Hadamard transform (Hadamard transformation, also known as the Walsh-Hadamard transformation) is an example of a generalized class of Fourier transforms. The Hadamard transform is used in many signal processing, and data compression algorithms. In one aspect, the transformation modules 710 and 750 use the Hadamard transform.

A Hadamard transform matrix contains only the values +1 and −1 in such a way that all rows (columns) are mutually orthogonal. The presence of only the values +1 and −1 in the Hadamard transform matrix leads to a very low complexity multiplication-free implementation along with fast algorithms. The Hadamard transform matrix of order m (m≧3), equivalently of size $2^{(m-1)} \times 2^{(m-1)}$, can be generated based on a simple recursion involving the Kronecker product of an order 2 Hadamard matrix with an order (m−1) Hadamard matrix. A Kronecker product, is an operation on two matrices of arbitrary size resulting in a block matrix. It is a special case of a tensor product. The Kronecker product should not be confused with the usual matrix multiplication, which is an entirely different operation.

Let H be a Hadamard matrix of order n (n≧1). Then a partitioned matrix of equation Eq (1)

$$\begin{bmatrix} H & H \\ H & -H \end{bmatrix} \quad \text{Eq (1)}$$

is a Hadamard matrix of order (n+1). This observation can be applied repeatedly and leads to the following series of matrices starting with the smallest Hadamard matrix (of order 1 and size 1×1) in equation Eq (2), a second order (size 2×2) Hadamard matrix in equation Eq (3) and a third order (size 4×4) Hadamard matrix in equation Eq (4A) and Eq (4B):

$$H_1 = [1] \quad \text{Eq (2)}$$

$$H_2 = \begin{bmatrix} 1 & 1 \\ 1 & -1 \end{bmatrix}; \quad \text{Eq (3)}$$

$$H_3 = \begin{bmatrix} \begin{bmatrix} 1 & 1 \\ 1 & -1 \end{bmatrix} & \begin{bmatrix} 1 & 1 \\ 1 & -1 \end{bmatrix} \\ \begin{bmatrix} 1 & 1 \\ 1 & -1 \end{bmatrix} & \begin{bmatrix} 1 & 1 \\ 1 & -1 \end{bmatrix} \end{bmatrix}; \quad \text{Eq (4A)}$$

$$= \begin{bmatrix} 1 & 1 & 1 & 1 \\ 1 & -1 & 1 & -1 \\ 1 & 1 & -1 & -1 \\ 1 & -1 & -1 & 1 \end{bmatrix}. \quad \text{Eq (4B)}$$

The rows (columns) of a Hadamard matrix may be ordered arbitrarily, since all rows (columns) are orthogonal. However, there are three important orderings used in practice, namely Natural Ordering, Sequential Ordering and Bit-reversed Ordering. The series of Hadamard matrices generated by the above recursion are in the Natural Ordering form.

In one aspect, a 2-D 4×4 Hadamard transform based on a 1-D Hadamard transform of size 4 in Sequential Ordering form is used by the transformation modules 710 and 750. This ordering is based on the number of sign changes in a row analogous to the increasing frequency ordering of the Cosine basis functions of discrete cosine transform (DCT). Consequently, the transform data (i.e. the set of coefficients), is ordered in increasing frequency.

Thus, the Sequential Ordering form of $H_3$ is given by equation Eq (5):

$$H_3^S = \begin{bmatrix} 1 & 1 & 1 & 1 \\ 1 & 1 & -1 & -1 \\ 1 & -1 & -1 & 1 \\ 1 & -1 & 1 & -1 \end{bmatrix}, \quad \text{Eq (5)}$$

where, from top to bottom row, there are respectively 0, 1, 2, and 3 sign changes. More specifically, equation Eq (5) has been generated by shifting the second column of the matrix in equation Eq (4B) to the last column and moving columns 3 and 4 of Eq (4B) to columns 2 and 3, respectively, which corresponds to the increasing frequency order.

Figure 8:
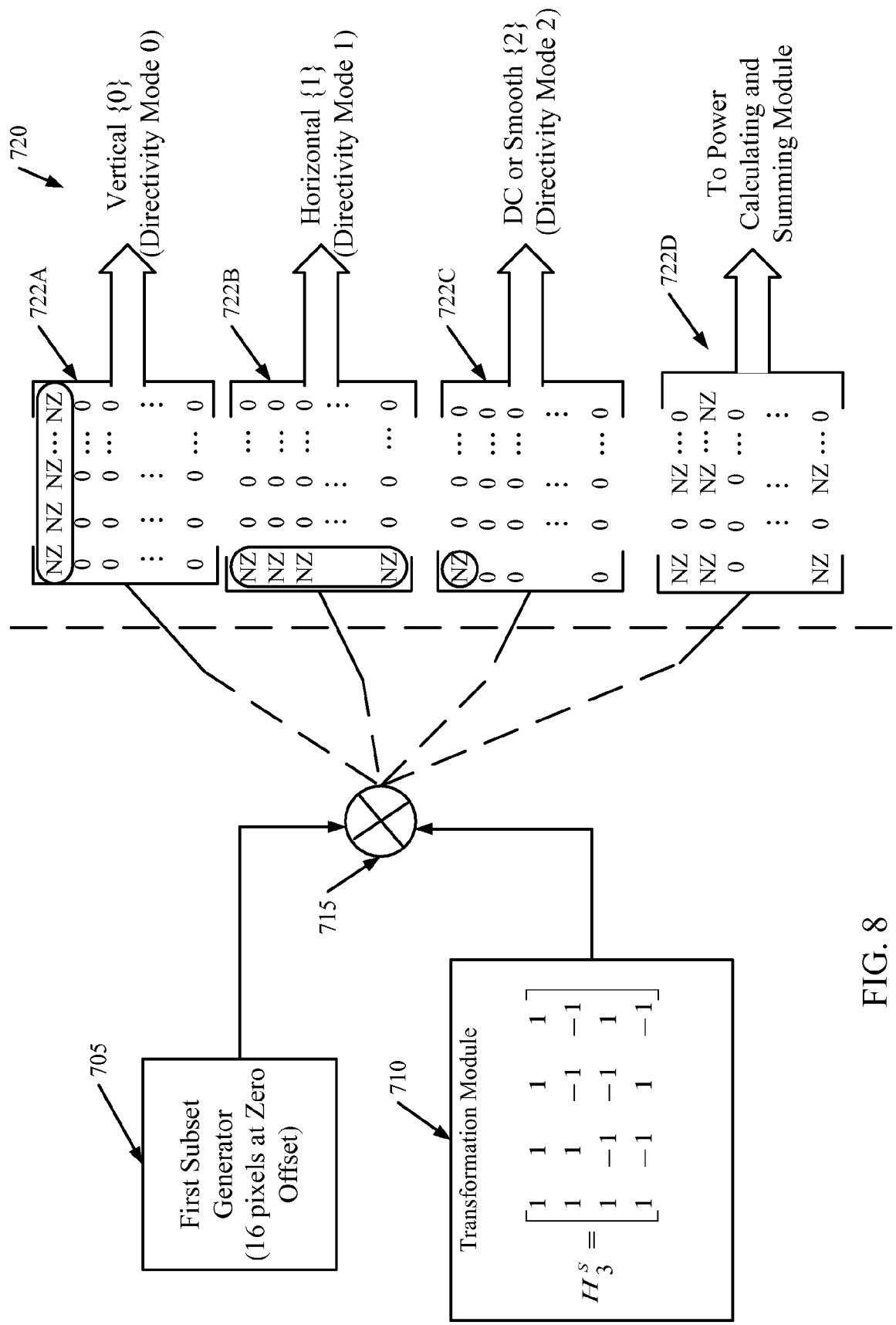
FIG. 8 illustrates a flow diagram of computations for a first intra prediction directivity classifying module processing a subblock.

FIG. 8 illustrates a flow diagram of computations for a first intra prediction directivity classifying module. The 2-D transform of the first pixel subset from the first subset generator 705 by the Hadamard transform of equation Eq (5) is sent to the first IPDC module 720. Examples of the resultant transform output matrix are shown to include block matrices 722A, 722B, 722C and 722D. In general, if the current subblock has a vertical directivity, the exemplary matrix 722A would be generated. Matrix 722A has a top row of coefficients which are essentially all non-zero (NZ). The remaining coefficients are all or nearly all zero. Hence the first IPDC module 720 when evaluating the matrix 722A would readily observe the pattern of NZ coefficients for accurately estimating the Mode {0} corresponding to the vertical vector 0 in FIG. 3B.

Matrix 722B has a first (leftmost) column of coefficients which are essentially all non-zero (NZ). The remaining coefficients are all or nearly all zero. Hence the first IPDC module 720 when evaluating the matrix 722B would readily observe the pattern of NZ coefficients for accurately estimating the Mode {1} corresponding to the horizontal vector 1 in FIG. 3B. Matrix 722C has an upper left corner coefficient which is non-zero (NZ). The remaining coefficients are all or nearly all zero. Hence the first IPDC module 720 when evaluating the matrix 722C would readily observe the NZ coefficient in the upper left corner to estimate the Mode {2} corresponding to DC in FIG. 3B. Modes {0} and {1} are separated by 90°.

Matrix 722D has a plurality of coefficients which are non-zero (NZ) and a plurality of coefficients which are zero. Furthermore, the positions of the said plurality of NZ coefficients and the said plurality of zero valued coefficients, do not fit to any of the structures identified in the matrices 722A, 722B, and 722C. Hence the first IPDC module 720 when evaluating the matrix 722D would readily observe that the pattern cannot be used to make an accurate estimation of Modes {3, 4, 5, 6, 7 and 8}. Instead, matrix 722D provides a hint for use in STAGE 3 (FIG. 7).

Figure 9:
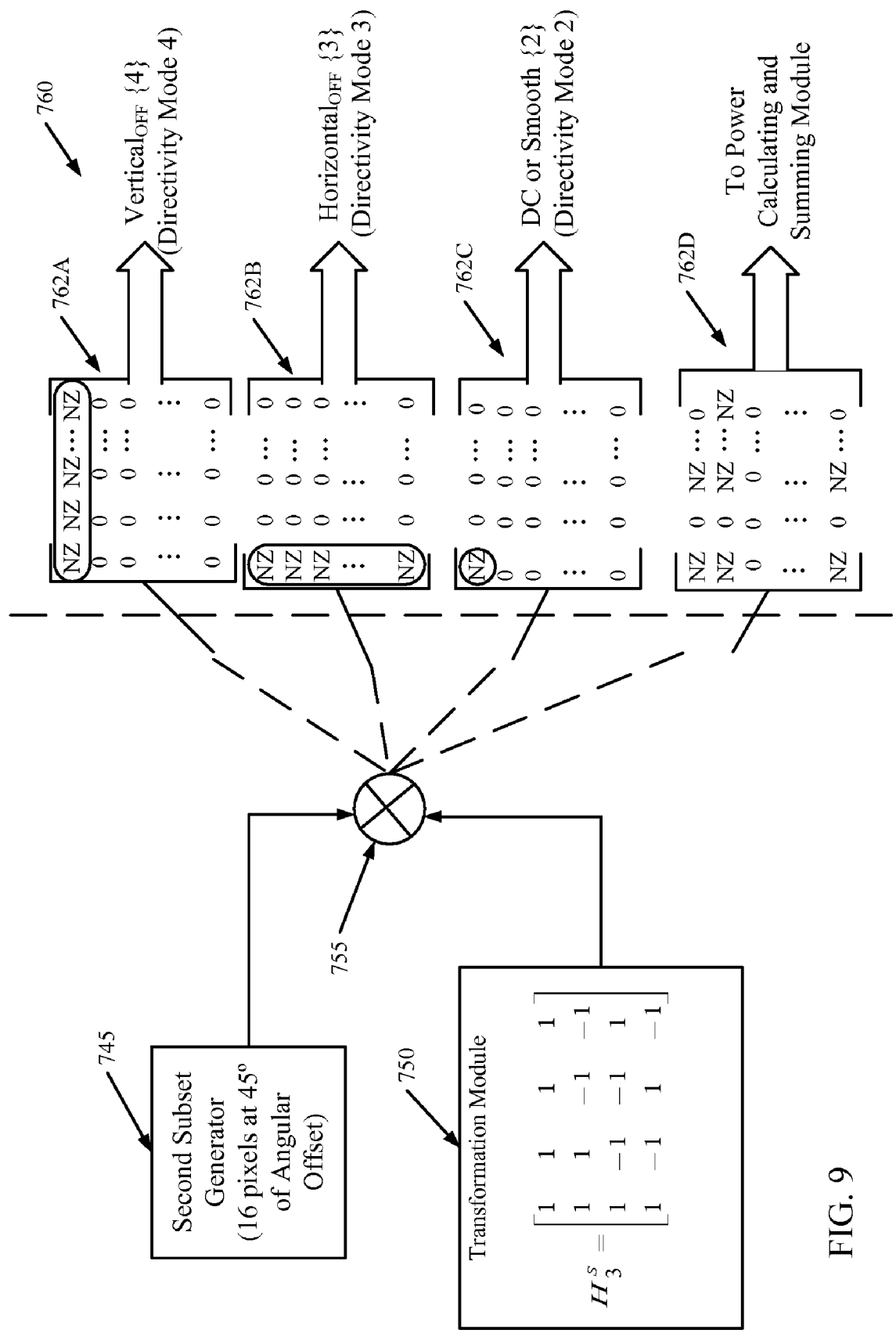
FIG. 9 illustrates a flow diagram of computations for a second intra prediction directivity classifying module processing a subblock.

FIG. 9 illustrates a flow diagram of computations for the second IPDC module 760. The 2-D transform of the second pixel subset from the second subset generator 745 by the Hadamard transform of equation Eq (5) is sent to the second IPDC module 760. Examples of the resultant transform output matrix are shown to include block matrices 762A, 762B, 762C and 762D. In general, if the current subblock has a directivity in accordance with vector 4, the exemplary matrix 762A would be generated. Matrix 762A has a top row of coefficients which are essentially all non-zero (NZ). The remaining coefficients are all or nearly all zero. Hence the second IPDC module 720 when evaluating the matrix 762A would readily observe the pattern of NZ coefficients for accurately estimating the Mode {4} corresponding to vector 4 in FIG. 3B. The diagonal grid essentially provides pixels which would generate similar 2-D transform output patterns as in FIG. 8 except the resultant vectors are offset by the directivity of the diagonal grid. In this case, those vectors which are +45° from the vertical vector 0 and −135° from the horizontal vector 1 are now being identified as vertical and horizontal respectively. Thereafter an offsetting angle is applied so that the vectors corresponding to 3 or 4 can be obtained. Modes {3} and {4} are separated by 90°.

Matrix 762C has an upper left corner coefficient which is non-zero (NZ). The remaining coefficients are all or nearly all zero. Hence the second IPDC module 760 when evaluating the matrix 762C would readily observe the NZ coefficient in the upper left corner to estimate the Mode {2} corresponding to DC in FIG. 3B.

Matrix 762D has a plurality of coefficients which are non-zero (NZ) and a plurality of coefficients which are zero. Furthermore, the positions of the said plurality of NZ coefficients and the said plurality of zero valued coefficients, do not fit to any of the structures identified in the matrices 762A, 762B, and 762C. Hence the second IPDC module 760 when evaluating the matrix 762D would readily observe that the pattern cannot be used to make an accurate estimation of Modes {5, 6, 7 and 8}. Instead, the matrix 762D may be used as a hint for interpolating the Modes in the oblique group.

Figure 10:
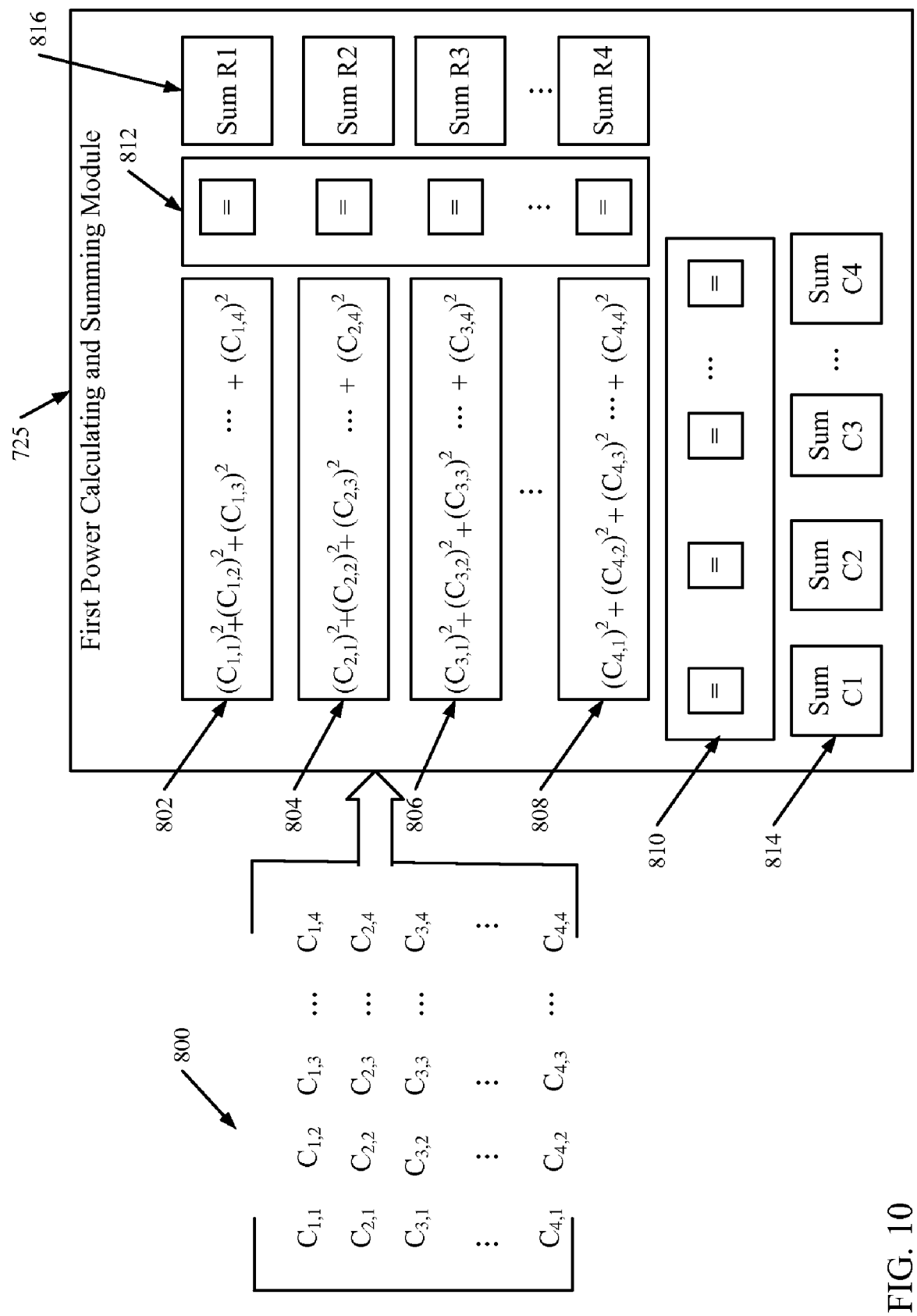
FIG. 10 illustrates a power calculating and summing module.

FIG. 10 illustrates the first power calculating and summing module 725. The matrix 800 corresponds to the matrix 722D and is a resultant 2-D transform output matrix. If the matrix of the Hadamard transform is an n-by-n matrix and the matrix of the pixel subset is an n-by-n matrix, then the 2-D transform produces an n-by-n matrix through the pre- and post-multiplication of the pixel subset matrix by the Hadamard transform matrix. In one aspect, the Hadamard transform matrix used is a 4×4 matrix. The 16 pixels in the pixel subset are also adapted to be arranged in a 4×4 matrix. Thus, the resultant 2-D transform output matrix is a 4×4 matrix. Nonetheless, other transform types, transform matrix sizes and corresponding pixel subset matrix sizes may be employed.

In the first PCS module 725, each coefficient in a row is squared to derive a power value. Then the squared results of these coefficients are summed for each row. The banks of equal signs 812 are illustrative to denote that a final value of the summed coefficients is generated and set equal to Sum R1 for row 802. Likewise the coefficients in the remaining rows, only 804, 806 and 808 shown, are squared and summed such that each row has a final summed value Sum R2, Sum R3, . . . Sum R4 at numeral 816.

In one aspect, each column of the squared coefficients are summed via sum bank of equal signs 810 to generate sums Sum C1, Sum C2, Sum C3, . . . Sum C4 at numeral 814. The second PCS module 765 in STAGE 2 performs the same operations on the resultant 2-D transform output matrix 762D (FIG. 9) from the transform operator 755. Thus, no further discussion is necessary for the second PCS module 765.

Figure 11:
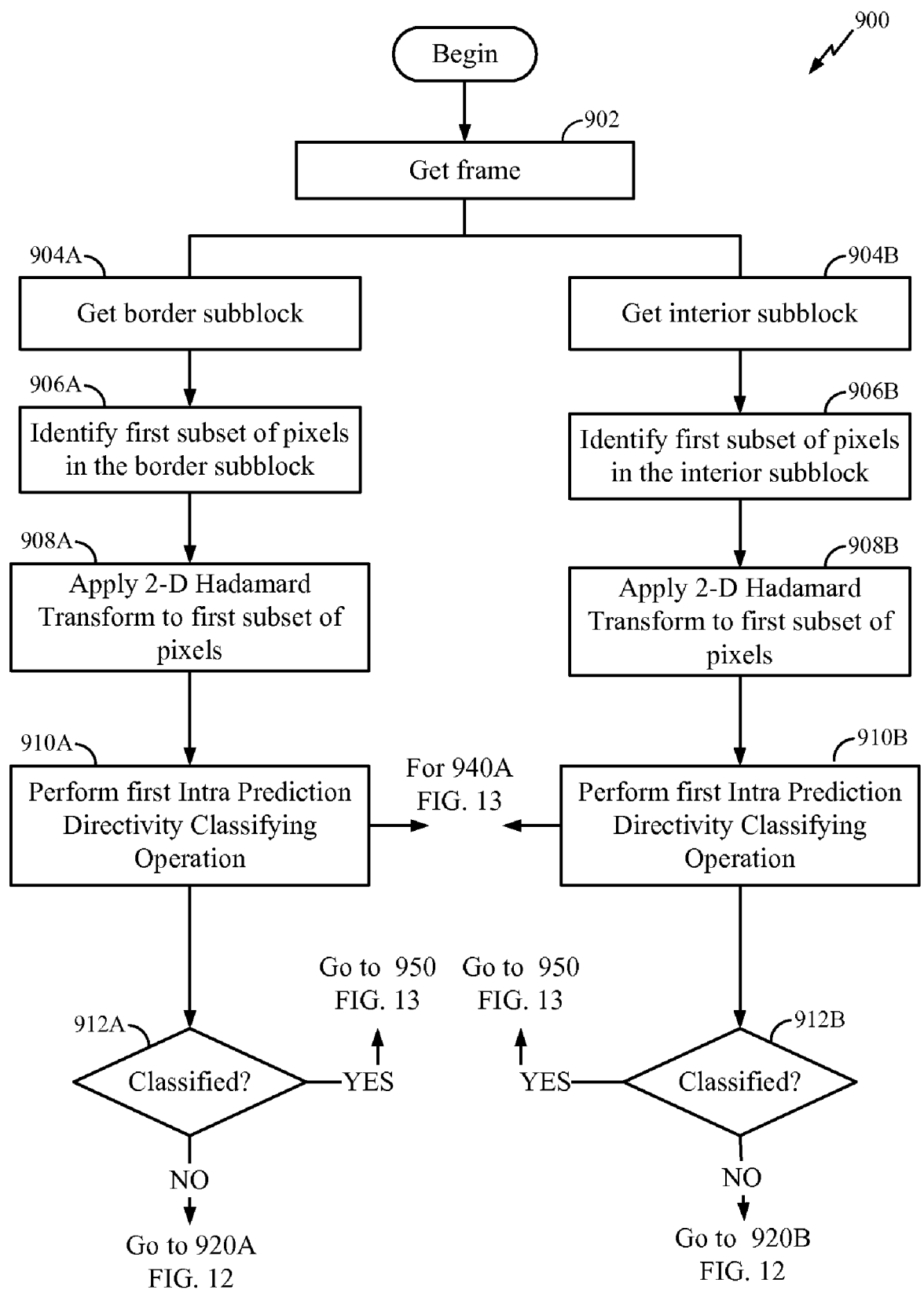
FIGS. 11-13 illustrate a flowchart of a process for accurately estimating an intra prediction directivity mode in accordance with certain embodiments.
Figure 12:
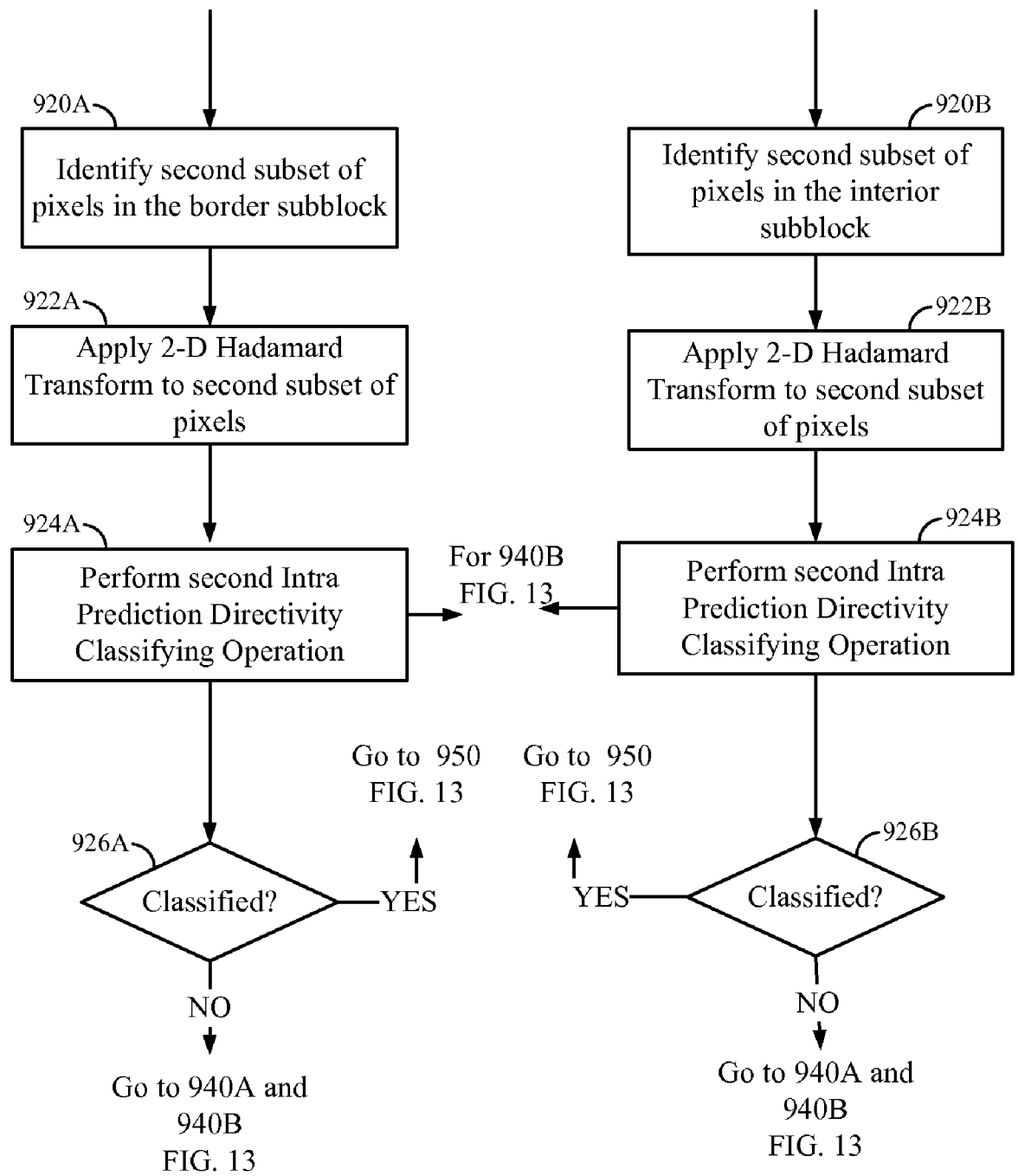
Figure 13:
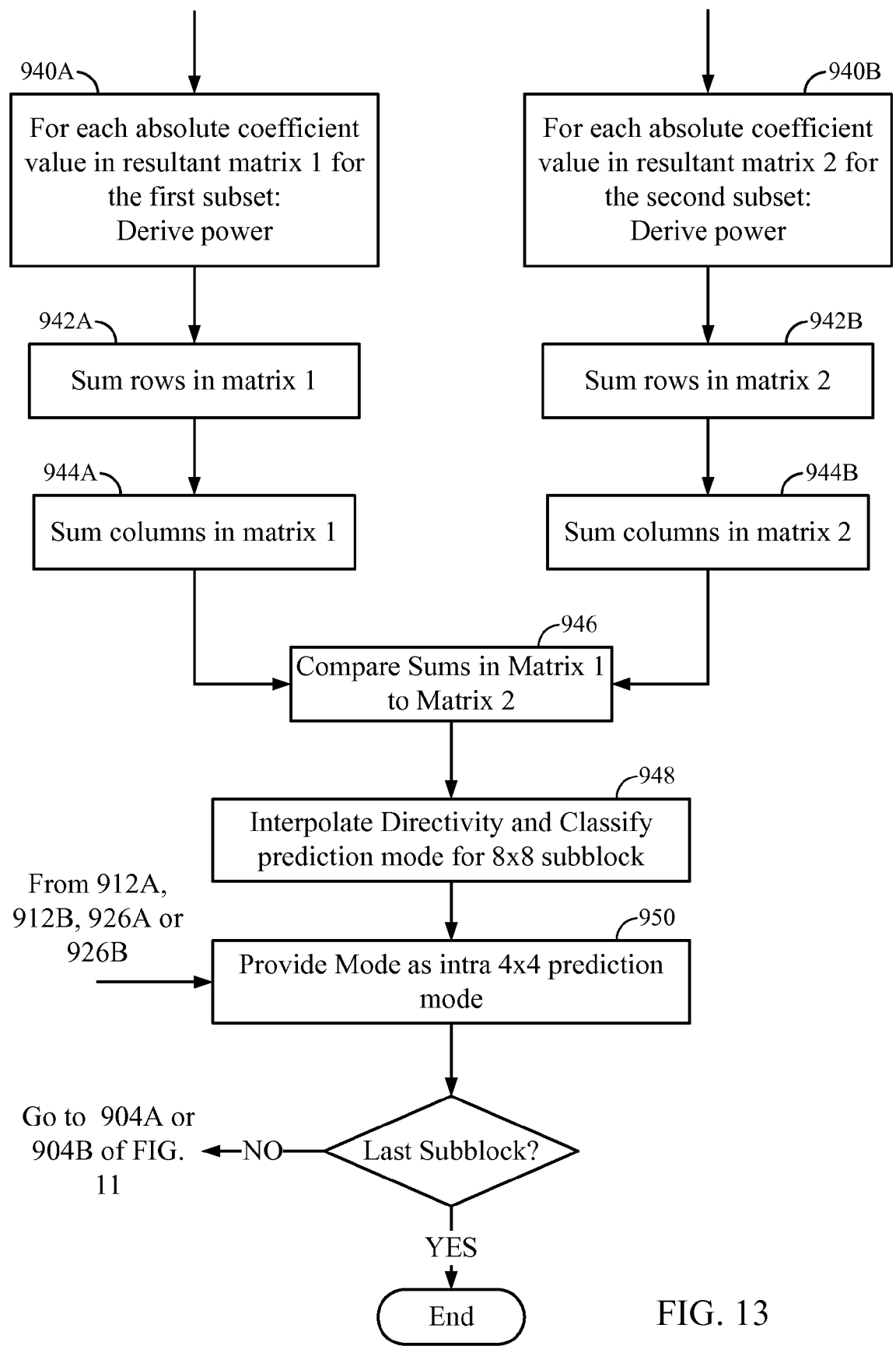

FIGS. 11-13 illustrate a flowchart of a process 900 for estimating an intra prediction directivity mode in accordance with certain embodiments. In various configurations below, flowchart blocks are performed in the depicted order or these blocks or portions thereof may be performed contemporaneously, in parallel, or in a different order. The process 900 begins with block 902 where an I-frame is obtained. Block 902 is followed by blocks 904A and 904B. At block 904A, a border subblock (i.e. subblock 310) is obtained. Block 904A is followed by block 906A where the first pixel subset for the current border subblock is obtained. Block 906A is followed by block 908A where a Hadamard transform (i.e. 2-D Hadamard transform) is applied to the first pixel subset for the current border subblock. Block 908A (and Block 908B described later) implements the transform operator 715 which constitutes a pre- and post-multiplication of the pixel subset matrix with the Hadamard transform matrix. Block 908A is followed by block 910A where the first IPDC operation takes place. Block 910A is followed by block 912A where a determination is made whether the current subblock is conclusively classified or a Mode {0, 1, or 2} is determined. If the determination is "YES," then the operation and evaluation on the current border subblock ends and the process 900 advances to block 950. If the determination at block 912A is "NO," then the process 900 advances to block 920A in FIG. 12 for further evaluation of the current border subblock.

Referring now to block 904B, at block 904B, an interior subblock (i.e. subblock 320) is obtained. Block 904B is followed by block 906B where the first pixel subset for the current interior subblock is obtained. Block 906B is followed by block 908B where a Hadamard transform (i.e. 2-D Hadamard transform) is applied to the first pixel subset for the current interior subblock. Block 908B is followed by block 910B where the first IPDC operation takes place. Block 910B is followed by block 912B where a determination is made whether the subblock is conclusively classified or a Mode {0, 1 or 2} is determined. If the determination is "YES," at block 912B then the operation and evaluation on the current interior subblock ends and the process 900 advances to block 950 described later.

If the determination at block 912B is "NO," then the process 900 advances to block 920B in FIG. 12 for further evaluation of the current interior subblock. The resultant 2-D transform output matrix sent to block 910A or block 910B is also made available to block 940A when needed.

For exemplary purposes, the blocks 904A, 906A, 908A, 910A, and 912A for a current border subblock is shown parallel to blocks 904B, 906B, 908B, 910B and 912B for a current interior subblock. As can be appreciated, for a current subblock, the subblock is only one of a border subblock or an interior subblock. Thus, the operations, as it relates to any one current subblock are not performed in parallel unless maybe by a processor with parallel processing capability.

If the determination at blocks 912A or 912B is "NO," then the process 900 continues to block 920A or 920B respectively depending on whether the current subblock is a border subblock or an interior subblock. Hence, process 900 only requires those operations associated with STAGE 1 to accurately predict a subset of modes having a 90° angle therebetween for a current subblock. Thus, the process 900 is computationally reduced while providing a highly accurate prediction.

At block 920A, a second pixel subset for the current border subblock is obtained. In this stage, the second pixel subset is from a diagonal grid 412B. Block 920A is followed by block 922A where a Hadamard transform (i.e. 2-D Hadamard transform) is applied to the second pixel subset for the current border subblock. Block 922A (and Block 922B described later) implements the transform operator 755 which constitutes a pre- and post-multiplication of the second pixel subset matrix with the Hadamard transform matrix. Block 922A is followed by block 924A where the second IPDC operation takes place. Block 924A is followed by block 926A where a determination is made whether the current border subblock is conclusively classified or a Mode {3, 4, or 2} is determined. If the determination is "YES," at block 926A then the operation and evaluation on the current border subblock ends and the process 900 advances to block 950 described later.

If the determination at block 926A is "NO," then the process 900 advances to blocks 940A and 940B in FIG. 13 for further evaluation of the current border subblock in STAGE 3.

At block 920B, a second pixel subset for the current interior subblock is obtained. In this stage, the second pixel subset is from a diagonal grid 522B or 622. Block 920B is followed by block 922B where a Hadamard transform (i.e. 2-D Hadamard transform) is applied to the second pixel subset for the current interior subblock. Block 922B is followed by block 924B where the second IPDC operation takes place. Block 924B is followed by block 926B where a determination is made whether the current interior subblock is conclusively classified or a Mode {3, 4, or 2} is determined. If the determination is "YES," at block 926B then the operation and evaluation on the current interior subblock ends and the process 900 advances to block 950 described later.

If the determination at block 926B is "NO," then the process 900 advances to blocks 940A and 940B in FIG. 13 for further evaluation of the current interior subblock.

For exemplary purposes, the blocks 920A, 922A, 924A, and 926A for a border subblock is shown parallel to blocks 920B, 922B, 924B, and 926B for an interior subblock. As can be appreciated, for a current subblock, the subblock is only one of a border subblock or an interior subblock. Thus, these two sets of operations, as it relates to any on current subblock are not performed in parallel. Hence, process 900 only requires those operations associated with STAGE 2 to accurately predict a second subset of modes having a 90° angle therebetween for the current subblock.

If the determination at blocks 926A or 926B is "NO," then the process 900 continues to blocks 940A and 940B. The resultant 2-D transform output matrix sent to block 924A for a current border subblock or 924B for a current interior subblock is also made available to blocks 940A and 940B when needed.

Referring now to FIGS. 11 and 13, the matrix from blocks 910A or 910B associated with a current subblock is hereinafter referred to as "matrix 1." Referring to FIGS. 12 and 13, the matrix from blocks 924A or 924B associated with the same current subblock is hereinafter referred to as "matrix 2." Matrix 1 is shown in FIG. 10 and denoted by numeral 800. The matrix 1 is sent to the first power calculating and summing module 725 where the power is derived for each coefficient in the matrix 1. The power is derived by squaring the coefficient at block 940A. Then the squared coefficients in each row are summed at block 942A to obtain the summed row power (R1, R2, R3, . . . , R4) at 816 in FIG. 10. Furthermore, the squared coefficients in each column are summed at block 944A to obtain the summed column power (C1, C2, C3, . . . , C4) at 814 in FIG. 10.

Likewise, the matrix from blocks 924A or 924B associated with a current subblock is hereinafter referred to as "matrix 2." Matrix 2 is similar to the matrix shown in FIG. 10 and denoted by numeral 800. The matrix 2 is sent to the second power calculating and summing module 765 where the power is derived for each coefficient in the matrix 2. The power is derived by squaring the coefficient at block 940B. Then the squared coefficients in each row are summed at block 942B to obtain the summed row power. Furthermore, the squared coefficients in each column are summed at block 944B to obtain the summed column power.

Blocks 944A and 944B are both followed by block 946 where the sums in matrix 1 and matrix 2 are compared. Block 946 performs a comparative analysis of the sums in matrix 1 and matrix 2 to identify how close are the power distributions presented by each matrix, to the characteristic power distributions for Modes (0, 1, 2) or Modes (3, 4, 2) specified previously by respective matrices (722A, 722B 722C) or (762B, 762A, 762C). In one aspect, if in matrix 1 sum R1 is considerably greater than (R2+R3+R4) or equivalently if the ratio R1/(R2+R3+R4) is greater than a threshold of value 20.0, then Block 946 may decide to classify the prediction mode for the current subblock as 'Fundamentally Vertical' or as Mode 0. In general Block 946 executes similar relative comparisons between various sums from both matrix 1 and matrix 2. Block 946 is followed by block 948 where interpolation of the results is performed to determine the directivity and classify the prediction mode for Modes {5, 6, 7, or 8}. Block 948 is followed by block 950 where the identified Mode from STAGE 1, STAGE 2 or STAGE 3 is used for intra_4×4 prediction mode or other prediction modes for the current subblock. The vectors 5, 6, 7 and 8 are 22.5° (or half the angular distance) between any one of the previously accurately predicted vectors or modes.

Block 950 is followed by block 952 where a determination is made whether the current subblock is the last subblock of the frame 300. If the determination is "YES," the process 900 ends. However, if the determination at block 952 is "NO," then the process 900 returns to block 904A or 904B to get the next subblock in frame 300.

As can be seen from the description above, process 900 assesses in a computationally efficient manner and with high accuracy the intra predictability of a macroblock which is an important component of mode decision algorithms executed by encoders/transcoders. In conjunction with achieving the above two goals i.e. computational efficiency and accuracy, the process 900 also provides the most descriptive direction for 8×8 subblocks which can be used as a complexity reducing input (hint) to the final mode decision stage in which the final modes are determined. In the final mode decision stage, an encoder device jointly looks at the rate-distortion merits of all different macroblock coding types allowable for the current macroblock being encoded. For example, for a macroblock in an I type coded frame, allowable macroblock coding types comprise intra_4×4 or intra_16×16 for luminance channel and intra_8×8 for chroma channels. For a macroblock in a P or B type coded picture, this list of permissible macroblock coding options will be appended with various inter coding options.

As can be readily seen, the first pixel subset and the second pixel subset are two mutually exclusive subsets of pixels which are identified within an 8×8 subblock of a macroblock in the luminance (Y) channel. Two different pairs of such subsets, each consisting of 16 pixels, are illustrated in FIGS. 5A and 5B. Based on neighbor availability other subsets are utilized such as shown in FIGS. 6A and 6B or 6C. The introduced pixel subset pairs define two subsampling grids to which 4×4 2-D Hadamard transforms are applied.

At the output of the 2-D Hadamard transform, based on comparisons (this is where integer divisions may be needed) of sums of squared coefficient values or in one aspect based on comparisons of sums of absolute coefficient values, within pre-defined coefficient subsets, the transform result (or equivalently the directivity structure of the corresponding pixel grid) can be classified into one of the following categories: Fundamentally vertical; Close to vertical; Fundamentally horizontal; Close to horizontal; Smooth; Other (i.e. none of the above) at block 946.

Based on such classification of both Hadamard transform results, one from the rectangular grid and the other from the diagonal grid, Table 1 illustrates how the 8×8 block can be classified with respect to its amenability to intra_4×4 prediction. In this table, the final classification result 'Texture' suggest poor intra prediction performance, whereas all other final numeric classification results suggest good intra prediction performance with the numeric value describing the best fitting intra_4×4 prediction mode.

In order to keep the complexity of the process 900 low, a lightweight pruned decision tree can be implemented to approximate the classification implemented by Table 1.

TABLE 1

8 × 8 Block classification and directivity decisions

| | | Classification Result for the Hadamard Transform on the Diagonal Grid | | | | | |
|---|---|---|---|---|---|---|---|
| | | Fundamentally Vertical | Close to Vertical | Fundamentally Horizontal | Close to Horizontal | Smooth | Other |
| Classification Result for the Hadamard Transform on the Rectangular Grid | Fundamentally Vertical | Texture | 0 or 5 | Texture | 0 or 7 | Texture | 0 |
| | Close to Vertical | 4 or 5 | 5 | 3 or 7 | 7 | Texture | 0, 5 or 7 |
| | Fundamentally Horizontal | Texture | 1 or 6 | Texture | 1 or 8 | Texture | 1 |
| | Close to Horizontal | 4 or 6 | 6 | 3 or 8 | 8 | Texture | 1, 6 or 8 |
| | Smooth | Texture | Texture | Texture | Texture | 2 | Texture |
| | Other | 4 | 4, 5 or 6 | 3 | 3, 7 or 8 | Texture | Texture |

A vertical pattern such as a vertical edge, will be conclusively revealed through the transform result on the rectangular grid and the resulting classification will be 'Fundamentally Vertical'. This vertical pattern will be neither vertical-like nor horizontal-like in the analysis on the diagonal grid, and hence its classification will be 'Other'. As can be readily seen from Table 1, this sample case corresponds to the last column in the first row of Table 1, which marks the final classification mode as {0} conclusively. As a second example, considering a directional pattern aligned with Vector 6 in FIG. 3B, the transform result on the rectangular grid will lead to the estimation of a 'Close to horizontal' classification. The same oblique pattern aligned with Vector 6 in FIG. 3B, as a result of the transform on the diagonal grid will lead to the estimation of a 'Close to vertical' classification. As can be readily seen from Table 1, this second sample case corresponds to the $4^{th}$ row and $2^{nd}$ column of Table 1, which marks the final classification mode as {6} conclusively.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in one or more software modules executed by one or more processing elements, or in a combination of the two. A software module may reside in RAM memory, flash memory, ROM memory, EPROM memory, EEPROM memory, registers, hard disk, a removable disk, a CD-ROM, or any other form or combination of storage medium known in the art. An example storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and additional elements may be added.

What is claimed is:

1. A device comprising:
   a processor operable to determine a first spatial prediction mode from a first subset of spatial prediction modes based on a first pixel subset of a current subblock of an intra-frame, wherein the first subset of spatial prediction modes includes spatial prediction modes with a vertical directivity, a horizontal directivity, and no clear directivity, and to determine a second spatial prediction mode from a second subset of spatial prediction modes based on a second pixel subset of the current subblock in the case that the first spatial prediction mode is unable to be determined, wherein the second subset of spatial prediction modes includes spatial prediction modes with a diagonal directivity, wherein the first pixel subset is selected from said current subblock and pixels of said first pixel subset are arranged in a rectangular grid arrangement such that adjacent selected pixels in the first pixel subset do not touch each other, and wherein the second pixel subset is also selected from said current subblock and pixels of said second pixel subset are in a diagonal grid arrangement such that only two or more corners of adjacent selected pixels touch the corners of other selected pixels in the diagonal grid arrangement; and a memory coupled to the processor.

2. The device according to claim 1, wherein the processor is further operable to interpolate a directivity associated with a third subset of spatial prediction modes different from the first subset of spatial prediction modes and the second subset of spatial prediction modes based on the first and second pixel subsets, wherein the third set of spatial prediction modes includes spatial prediction modes with an oblique directivity, and wherein the processor is further operable to determine a third spatial prediction mode from the third subset of spatial prediction modes based on the interpolated directivity in the case that the first spatial prediction mode and the second spatial prediction mode are unable to be determined.

3. The device according to claim 2, wherein the first subset of spatial prediction modes is based on a first pair of vectors displaced by 90°; the second subset of spatial prediction modes is based on a second pair of vectors displaced by 90°; and the third subset of spatial prediction modes is based on a plurality of vectors displaced by 22.5° from any one of the first pair of vectors and the second pair of vectors.

4. The device according to claim 1, wherein the processor, when determining the first spatial prediction mode, is operable to perform a first transform operation on the first pixel subset to derive a first resultant matrix having a pattern of coefficients associated with identifying the first spatial prediction mode and, when determining the second spatial prediction mode, is operable to perform a second transform operation on the second pixel subset to derive a second resultant matrix having the pattern of coefficients associated with identifying the second spatial prediction mode.

5. The device according to claim 4, wherein the first transform operation and the second transform operation use a Hadamard transform.

6. The device according to claim 1, wherein the first pixel subset is arranged in a rectangular sampling grid arrangement; the second pixel subset is arranged in a diagonal sampling grid arrangement; and the rectangular sampling grid and the diagonal sampling grid arrangement together form an oblique sampling grid arrangement.

7. The device according to claim 1, where pixels of the first pixel subset and pixels of the second pixel subset are mutually exclusive.

8. The device according to claim 1, where pixels of the first pixel subset and pixels of the second pixel subset are partially overlapping.

9. A multimedia system comprising:
an encoder operable to determine a first spatial prediction mode from a first subset of spatial prediction modes based on a first pixel subset of a current subblock of an intra-frame, wherein the first subset of spatial prediction modes includes spatial prediction modes with a vertical directivity, a horizontal directivity, and no clear directivity, and to determine a second spatial prediction mode from a second subset of spatial prediction modes based on a second pixel subset of the current subblock in the case that the first spatial prediction mode is unable to be determined, wherein the second subset of spatial prediction modes includes spatial prediction modes with a diagonal directivity, wherein the first pixel subset is selected from said current subblock and pixels of said first pixel subset are arranged in a rectangular grid arrangement such that adjacent selected pixels in the first pixel subset do not touch each other, and wherein the second pixel subset is also selected from said current subblock and pixels of said second pixel subset are in a diagonal grid arrangement such that only two or more corners of adjacent selected pixels touch the corners of other selected pixels in the diagonal grid arrangement; and a decoder operable to decode the intra-frame based on the first subset of spatial prediction modes and the second subset of spatial prediction modes.

10. The system according to claim 9, wherein the encoder is further operable to interpolate a directivity associated with a third subset of spatial prediction modes different from the first subset of spatial prediction modes and the second subset of spatial prediction modes based on the first and second pixel subsets, wherein the third set of spatial prediction modes includes spatial prediction modes with an oblique directivity, and wherein the processor is further operable to determine a third spatial prediction mode from the third subset of spatial prediction modes based on the interpolated directivity in the case that the first spatial prediction mode and the second spatial prediction mode are unable to be determined.

11. The system according to claim 10, wherein the first subset of spatial prediction modes is based on a first pair of vectors displaced by 90°; the second subset of spatial prediction modes is based on a second pair of vectors displaced by 90°; and the third subset of spatial prediction modes is based on a plurality of vectors displaced by 22.5° from any one of the first pair of vectors and the second pair of vectors.

12. The system according to claim 9, wherein the encoder, when determining the first spatial prediction mode, is operable to perform a first transform operation on the first pixel subset to derive a first resultant matrix having a pattern of coefficients associated with identifying the first spatial prediction mode and, when determining the second spatial prediction mode, is operable to perform a second transform operation on the second pixel subset to derive a second resultant matrix having the pattern of coefficients associated with identifying the second spatial prediction mode.

13. The system according to claim 12, wherein the first transform operation and the second transform operation use a Hadamard transform.

14. The system according to claim 9, wherein the first pixel subset is arranged in a rectangular sampling grid arrangement; the second pixel subset is arranged in a diagonal sampling grid arrangement; and the rectangular sampling grid and the diagonal sampling grid arrangement together form an oblique sampling grid arrangement.

15. The system according to claim 9, where pixels of the first pixel subset and pixels of the second pixel subset are mutually exclusive.

16. The system according to claim 9, where pixels of the first pixel subset and pixels of the second pixel subset are partially overlapping.

17. A multimedia system comprising:
means for determining a first spatial prediction mode from a first subset of spatial prediction modes based on a first pixel subset of a current subblock of an intra-frame, wherein the first subset of spatial prediction modes includes spatial prediction modes with a vertical directivity, a horizontal directivity, and no clear directivity;
means for determining a second spatial prediction mode from a second subset of spatial prediction modes based on a second pixel subset of the current subblock in the case that the first spatial prediction mode is unable to be determined, wherein the second subset of spatial prediction modes includes spatial prediction modes with a diagonal directivity, wherein the first pixel subset is selected from said current subblock and pixels of said first pixel subset are arranged in a rectangular grid arrangement such that adjacent selected pixels in the first pixel subset do not touch each other, and wherein the second pixel subset is also selected from said current subblock and pixels of said second pixel subset are arranged in a diagonal grid arrangement such that only two or more corners of adjacent selected pixels touch the corners of other selected pixels in the diagonal grid arrangement; and means for encoding the intra-frame based on the first spatial prediction mode or, in the case that the first spatial prediction mode is unable to be determined, based on the second spatial prediction mode.

18. The system according to claim 17, further comprising:
means for interpolating a directivity associated with a third subset of spatial prediction modes different from the first subset of spatial prediction modes and the second subset of spatial prediction modes based on the first and second pixel subsets, wherein the third set of spatial prediction modes includes spatial prediction modes with an oblique directivity; and
means for determining a third spatial prediction mode from the third subset of spatial prediction modes based on the interpolated directivity in the case that the first spatial prediction mode and the second spatial prediction mode are unable to be determined.

19. The system according to claim 18, wherein the first subset of spatial prediction modes is based on a first pair of vectors displaced by 90°; the second subset of spatial prediction modes is based on a second pair of vectors displaced by 90°; and the third subset of spatial prediction modes is based on a plurality of vectors displaced by 22.5° from any one of the first pair of vectors and the second pair of vectors.

20. The system according to claim 17, wherein the means for determining the first spatial prediction mode includes means for performing a first transform operation on the first pixel subset to derive a first resultant matrix having a pattern of coefficients associated with identifying the first spatial prediction mode, and wherein the means for determining the second spatial prediction mode is operable to perform a second transform operation on the second pixel subset to derive a second resultant matrix having the pattern of coefficients associated with identifying the second spatial prediction mode.

21. The system according to claim 20, wherein the first transform operation and the second transform operation use a Hadamard transform.

22. A computer program product that includes a non-transitory computer readable medium comprising instructions for processing multimedia data, wherein the instructions cause a computer to:
determine a first spatial prediction mode from a first subset of spatial prediction modes based on a first pixel subset of a current subblock of an intra-frame, wherein the first subset of spatial prediction modes includes spatial prediction modes with a vertical directivity, a horizontal directivity, and no clear directivity;
determine a second spatial prediction mode from a second subset of spatial prediction modes based on a second pixel subset of the current subblock in the case that the first spatial prediction mode is unable to be determined, wherein the second subset of spatial prediction modes includes spatial prediction modes with a diagonal directivity, wherein the first pixel subset is selected from said current subblock and pixels of said first pixel subset are arranged in a rectangular grid arrangement such that adjacent selected pixels in the first pixel subset do not touch each other, and wherein the second pixel subset is also selected from said current subblock and pixels of said second pixel subset are arranged in a diagonal grid arrangement such that only two or more corners of adjacent selected pixels touch the corners of other selected pixels in the diagonal grid arrangement; and
encode the intra-frame based on the first spatial prediction mode or, in the case that the first spatial prediction mode is unable to be determined, based on the second spatial prediction mode.

23. The computer program product according to claim 22, further comprising instructions to cause the computer to:
interpolate a directivity associated with a third subset of spatial prediction modes different from the first subset of spatial prediction modes and the second subset of spatial prediction modes based on the first and second pixel subsets, wherein the third set of spatial prediction modes includes spatial prediction modes with an oblique directivity; and
determine a third spatial prediction mode from the third subset of spatial prediction modes based on the interpolated directivity in the case that the first spatial prediction mode and the second spatial prediction mode are unable to be determined.

24. The computer program product according to claim 23, wherein the first subset of spatial prediction modes is based on a first pair of vectors displaced by 90°; the second subset of spatial prediction modes is based on a second pair of vectors displaced by 90°; and the third subset of spatial prediction modes is based on a plurality of vectors displaced by 22.5° from any one of the first pair of vectors and the second pair of vectors.

25. The computer program product according to claim 22, wherein the instructions to cause the computer to determine the first spatial prediction mode include instructions to cause the computer to perform a first transform operation on the first pixel subset to derive a first resultant matrix having a pattern of coefficients associated with identifying the first spatial prediction mode.

26. The computer program product according to claim 25, wherein the first transform operation uses a Hadamard transform.

27. The computer program product according to claim 25, wherein the instructions to cause the computer to determine the second spatial prediction mode include instructions to cause the computer to perform a second transform operation on the second pixel subset to derive a second resultant matrix having the pattern of coefficients associated with identifying the second spatial prediction mode.

28. The computer program product according to claim 27, wherein the second transform operation uses a Hadamard transform.

29. A method comprising:
determining, with a processor, a first spatial prediction mode from a first subset of spatial prediction modes based on a first pixel subset of a current subblock of an intra-frame, wherein the first subset of spatial prediction modes includes spatial prediction modes with a vertical directivity, a horizontal directivity, and no clear directivity;

determining, with the processor, a second spatial prediction mode from a second subset of spatial prediction modes based on a second pixel subset of the current subblock in the case that the first spatial prediction mode is unable to be determined, wherein the second subset of spatial prediction modes includes spatial prediction modes with a diagonal directivity, wherein the first pixel subset is selected from said current subblock and pixels of said first pixel subset are arranged in a rectangular grid arrangement such that adjacent selected pixels in the first pixel subset do not touch each other, and wherein the second pixel subset is also selected from said current subblock and pixels of said second pixel subset are arranged in a diagonal grid arrangement such that only two or more corners of adjacent selected pixels touch the corners of other selected pixels in the diagonal grid arrangement; and encoding, with the processor, the intra-frame based on the first spatial prediction mode or, in the case that the first spatial prediction mode is unable to be determined, based on the second spatial prediction mode.

30. The method according to claim 29, further comprising: interpolating, with the processor, a directivity associated with a third subset of spatial prediction modes different from the first subset of spatial prediction modes and the second subset of spatial prediction modes based on the first and second pixel subsets, wherein the third set of spatial prediction modes includes spatial prediction modes with an oblique directivity; and determining a third spatial prediction mode from the third subset of spatial prediction modes based on the interpolated directivity in the case that the first spatial prediction mode and the second spatial prediction mode are unable to be determined.

31. The method according to claim 29, wherein determining the first spatial prediction mode includes: performing, with the processor, a first transform operation on the first pixel subset; and further comprising: deriving, with the processor, a first resultant matrix having a pattern of coefficients associated with identifying the first spatial prediction mode.

32. The method according to claim 31, wherein the first transform operation uses a Hadamard transform.

33. The method according to claim 31, wherein determining the second spatial prediction mode includes: performing, with the processor, a second transform operation on the second pixel subset; and further comprising: deriving, with the processor, a second resultant matrix having the pattern of coefficients associated with identifying the second spatial prediction mode.

34. The method according to claim 33, wherein the second transform operation uses a Hadamard transform.

* * * * *